US012697686B2

(12) United States Patent　　　(10) Patent No.:　US 12,697,686 B2
　　Fujii et al.　　　　　　　　　　(45) Date of Patent:　　　Aug. 4, 2026

(54) LASER MACHINING SYSTEM

(71) Applicant: Mitsubishi Electric Corporation, Tokyo (JP)

(72) Inventors: Kenta Fujii, Tokyo (JP); Motoaki Nishiwaki, Tokyo (JP); Kyohei Ishikawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 813 days.

(21) Appl. No.: 17/798,312

(22) PCT Filed: Mar. 17, 2020

(86) PCT No.: PCT/JP2020/011767
　　§ 371 (c)(1),
　　(2) Date: Aug. 9, 2022

(87) PCT Pub. No.: WO2021/186567
　　PCT Pub. Date: Sep. 23, 2021

(65) Prior Publication Data
　　US 2023/0080251 A1　　Mar. 16, 2023

(51) Int. Cl.
　　*B23K 26/38*　　　(2014.01)
　　*B23K 26/03*　　　(2006.01)
　　　　(Continued)
(52) U.S. Cl.
　　CPC .............. *B23K 26/38* (2013.01); *B23K 26/03* (2013.01); *B23K 26/032* (2013.01); *B23K 26/702* (2015.10); *B23K 31/006* (2013.01)
(58) Field of Classification Search
　　None
　　See application file for complete search history.

(56) References Cited

U.S. PATENT DOCUMENTS 4,462,746 A * 7/1984 Smets ....................... B07C 5/36
　　　　　　　　　　　　　　　　　　414/801
2004/0151364 A1* 8/2004 Kenneway ............ B07C 5/3422
　　　　　　　　　　　　　　　　　　382/152
(Continued)

FOREIGN PATENT DOCUMENTS

CN　　　103869750 A　　6/2014
CN　　　107199397 A　　9/2017
(Continued)

OTHER PUBLICATIONS

JP-2004306073-A (Miyajima Keiichiro) Nov. 4, 2004 [retrieved on Oct. 27, 2025]. Retrieved from Espacenet Database, translation by EPO and Google. (Year: 2004).*

(Continued)

*Primary Examiner* — Ibrahime A Abraham
*Assistant Examiner* — Franklin Jefferson Wang
(74) *Attorney, Agent, or Firm* — XSENSUS LLP

(57)　　　　　ABSTRACT

A control device that executes machining to cut a workpiece into a part and a remaining material; a detection unit that determines, as a time-series signal, a result of observing in time series a state of the workpiece; a machining state evaluation unit that determines, as evaluation information, a result of evaluation on a state of the machining for each of sections obtained by dividing the machining path, based on the time-series signal; an evaluation information storage unit that stores contour line evaluation information in which a contour line is associated with the evaluation information; and a sorting operation determination unit that determines a sorting control command for controlling sorting operation in which the part is taken out from a position where the workpiece is machined and moved to a target position, based on the contour line evaluation information; are provided.

14 Claims, 15 Drawing Sheets

(51) Int. Cl.
B23K 26/70 (2014.01)
B23K 31/00 (2006.01)

(56) References Cited

U.S. PATENT DOCUMENTS

| | | | |
|---|---|---|---|
| 2014/0170935 A1 | 6/2014 | Maurer | |
| 2016/0031109 A1 | 2/2016 | Abe | |
| 2017/0113300 A1* | 4/2017 | Lüdi | B23K 26/032 |
| 2017/0270434 A1* | 9/2017 | Takigawa | B23K 26/38 |
| 2019/0118226 A1* | 4/2019 | Shibasaki | G05B 13/0265 |
| 2020/0130107 A1* | 4/2020 | Mochizuki | B23K 26/702 |
| 2021/0162544 A1 | 6/2021 | Fujii et al. | |
| 2023/0013703 A1* | 1/2023 | Jost | B25J 15/0061 |

FOREIGN PATENT DOCUMENTS

| | | | |
|---|---|---|---|
| JP | 4-52036 A | | 2/1992 |
| JP | 2004306073 A | * | 11/2004 |
| JP | 2010-120071 A | | 6/2010 |
| JP | 2019-46293 A | | 3/2019 |
| WO | 2019/244484 A1 | | 12/2019 |

OTHER PUBLICATIONS

International Search Report and Written Opinion mailed on Jun. 16, 2020, received for PCT Application PCT/JP2020/011767, filed on Mar. 17, 2020, 8 pages including English Translation.

Office Action issued Mar. 13, 2024 in European Patent Application No. 20 926 310.2, 5 pages.

Extended European Search Report issued May 8, 2023 in European Patent Application No. 20926310.2, 6 pages.

Office Action mailed on Jul. 16, 2025 for corresponding Chinese patent application No. 202080098277.6.

\* cited by examiner (a)

(b)

| Id(IDENTIFIER) | EVALUATION INFORMATION CORRESPONDING TO IDENTIFIER |
|---|---|
| No.1 | pass |
| No.2 | failure |
| No.3 | pass |
| No.3-1 | failure |

FIG.11

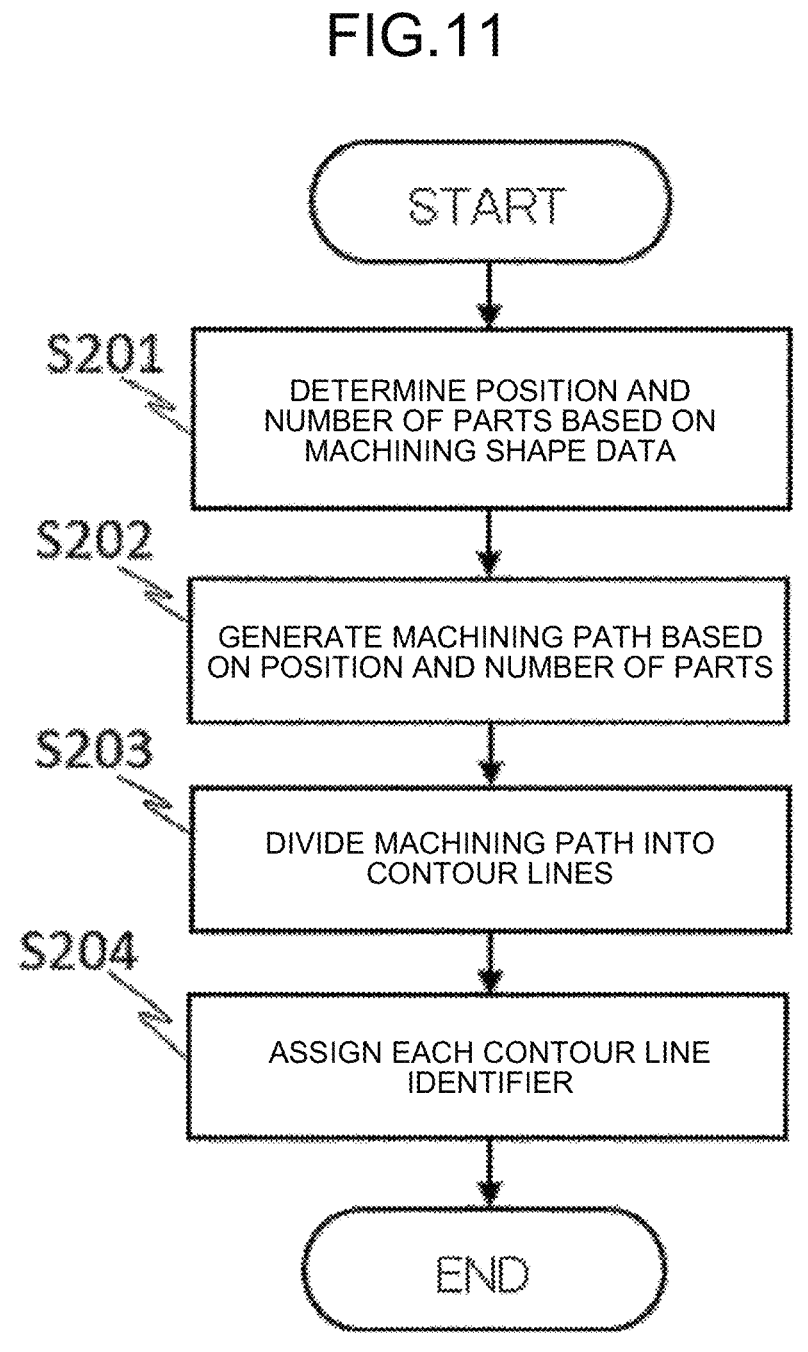

START

S201

DETERMINE POSITION AND
NUMBER OF PARTS BASED ON
MACHINING SHAPE DATA

S202

GENERATE MACHINING PATH BASED
ON POSITION AND NUMBER OF PARTS

S203

DIVIDE MACHINING PATH INTO
CONTOUR LINES

S204

ASSIGN EACH CONTOUR LINE
IDENTIFIER

END

LASER MACHINING SYSTEM

CROSS-REFERENCE TO RELATED APPLICATION

The present application is based on PCT filing PCT/JP2020/011767, filed Mar. 17, 2020, the entire contents of which is incorporated herein by reference.

FIELD

The present disclosure relates to a laser machining system that executes sorting to move a part cut out through laser cutting to a desired position.

BACKGROUND

In a laser machining device that cuts a workpiece into parts and a remaining material, if the parts to be sorted are classified and arranged after machining according to the type of part, machining state, or the like, the efficiency of the subsequent process can be improved.

Patent Literature 1 discloses a production monitoring system that monitors product isolation. In this production monitoring system, monitoring data is acquired from the processing machine on a product-by-product basis. Then, if evaluation information based on monitoring data is out of the threshold range, the product corresponding to this monitoring data is isolated from the other products. When the isolation from the other products is executed, a predetermined notification is provided, and the monitoring data out of the threshold range is displayed.

CITATION LIST

Patent Literature

Patent Literature 1: Japanese Patent Application Laid-open No. 2019-46293

SUMMARY

Technical Problem

In the production monitoring system described in Patent Literature 1, isolation is executed even when the monitoring data of the product to be isolated is defective. Thus, applying the production monitoring system described in Patent Literature 1 to the sorting of parts cut out through laser cutting is problematic in that, for example, the device may stop when the sorting of a part, which has not been separated from the remaining material due to machining defect, cannot be executed. It makes it difficult to provide a laser machining system capable of efficiently executing the operation of sorting parts that are cut out through laser cutting.

The present disclosure has been made in view of the above, and an object thereof is to provide a laser machining system capable of efficiently executing the operation of sorting parts that are cut out through laser cutting.

Solution to Problem

A laser machining system according to the present disclosure includes: a control device to control a laser oscillator and a drive unit and execute machining to cut a workpiece into a part and a remaining material, the laser oscillator being configured to emit a laser beam, the drive unit being configured to move, along a machining path, an irradiation point at which the workpiece is irradiated with the laser beam; a detection unit to determine, as a time-series signal, a result of observing in time series a state of the workpiece on which the machining is being executed; a machining state evaluation unit to determine, as evaluation information, a result of evaluation on a state of the machining for each of sections obtained by dividing the machining path, based on the time-series signal; an evaluation information storage unit to store contour line evaluation information in which a contour line is associated with the evaluation information, the contour line being a boundary between the part and the remaining material; and a sorting operation determination unit to determine a sorting control command based on the contour line evaluation information, the sorting control command being a command for controlling sorting operation in which the part is taken out from a position where the workpiece is machined and moved to a target position.

Advantageous Effects of Invention

According to the present disclosure, it is possible to provide a laser machining system capable of efficiently executing the operation of sorting parts that are cut out through laser cutting.

BRIEF DESCRIPTION OF DRAWINGS

FIG. 11 is a flowchart illustrating an example of an operation in which a program generation unit generates a machining program according to the second embodiment.

DESCRIPTION OF EMBODIMENTS

Hereinafter, embodiments will be described in detail with reference to the drawings. Note that the embodiments described below are examples, and the scope of the present disclosure is not limited by the embodiments described below. In addition, the embodiments described below can be appropriately combined for execution.

First Embodiment

Figure 1:
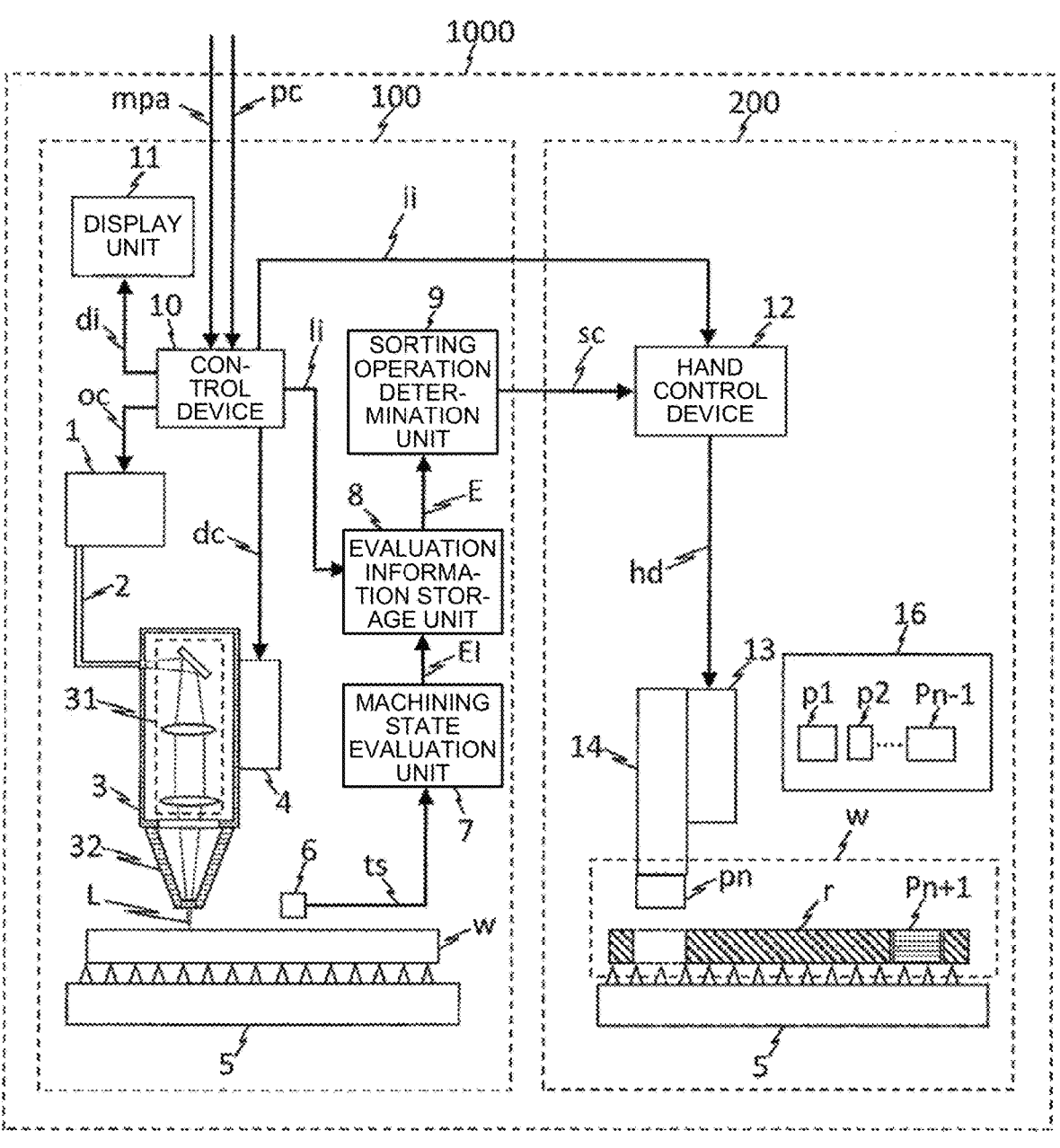
FIG. 1 is a diagram illustrating an exemplary configuration of a laser machining system according to a first embodiment.

FIG. 1 is a diagram illustrating an exemplary configuration of a laser machining system according to the first embodiment of the present disclosure. The laser machining system 1000 illustrated in FIG. 1 includes a laser machining device 100 that executes laser machining, and a sorting device 200 that sorts the parts that are cut out through the machining executed by the laser machining device 100. The laser machining device 100 includes a laser oscillator 1 that emits a laser beam L, an optical path 2 that guides the laser beam L, a machining head 3 including an optical system 31 that concentrates the laser beam L, and a pallet 5 on which a workpiece w is placed. The laser machining device 100 further includes a detection unit 6 that determines a time-series signal ts, a machining state evaluation unit 7 that determines evaluation information EI, an evaluation information storage unit 8 that stores contour line evaluation information E, and a sorting operation determination unit 9 that determines a sorting control command sc. The laser machining device 100 further includes a control device 10 that determines an oscillator command oc and a drive command dc, and a drive unit 4 that moves, along a machining path, the irradiation point at which the workpiece w is irradiated with the laser beam L. Note that the pallet 5 moves the workpiece w to the sorting device 200 after machining is executed by moving between the laser machining device 100 and the sorting device 200.

The sorting device 200 includes a hand control device 12 that determines a hand drive command hd based on the sorting control command sc, a hand drive unit 13 that drives a hand 14 based on the hand drive command hd, and the hand 14 mechanically connected to the hand drive unit 13. The sorting device 200 further includes a parts yard 16 in which the parts moved from cut-out positions are placed. The hand 14 grips a part on the pallet 5 and moves the part to the parts yard 16.

The laser oscillator 1 emits the laser beam L based on the oscillator command oc. Examples of the laser oscillator 1 can include a solid-state laser, a fiber laser, a gas laser, and a diode laser. The oscillator command oc is a command with which the control device 10 controls the laser oscillator 1.

The oscillator command oc may specify the laser output, pulse width, duty ratio, peak intensity, current, operation timing of the laser oscillator 1, and the like. The laser beam L emitted from the laser oscillator 1 passes through the optical path 2 and enters the machining head 3. The optical path 2 may be a space including a mirror, a lens, or the like for guiding light. Alternatively, the optical path 2 may be an optical fiber connected between the laser oscillator 1 and the machining head 3. Note that if the optical path 2 includes an instrument such as a shutter or a beam variable mechanism, the oscillator command oc, or the drive command dc that is described later may include a command specifying the operation of the instrument.

The machining head 3 includes the optical system 31 that concentrates the laser beam L. As illustrated in FIG. 1, a nozzle 32 may be provided so that the laser beam L and machining gas are emitted therethrough from inside the machining head 3 toward the workpiece w. The workpiece w is placed on the pallet 5. The drive unit 4 changes the position of the workpiece w and/or the machining head 3, and changes the relative position of the workpiece w and the machining head 3 based on the drive command dc. As the drive unit 4, a servo control device including a motor and a position detector may be employed, and the motor may be a linear motor. The servo control device may employ a drive mechanism in which a motor and a gear are used. The drive mechanism does not necessarily have a linear motion shaft, and a drive mechanism having a rotation shaft like an articulated robot may be employed. The structures of the pallet 5, the machining head 3, and the like are not limited to those illustrated in FIG. 1, and only need to enable the relative position of the workpiece w and the machining head 3 to be changed according to the drive command dc.

The control device 10 determines the oscillator command oc and the drive command dc, and controls the laser oscillator 1 and the drive unit 4. The control device 10 moves, along a machining path, the irradiation point at which the workpiece w is irradiated with the laser beam L, and executes machining to cut the workpiece w into a part and a remaining material r. Here, a portion of the machined workpiece w to be used is referred to as a part. Any portion other than a part, that is, a portion not to be used, is referred to as the remaining material r. Note that, in distinguishing the remaining material r and a part, reuse or the like of the remaining material r or the part is not taken into consideration. Hereinafter, the oscillator command oc and the drive command dc may be collectively referred to as commands. In addition, the machining path may have any form with which the trajectory of the irradiation point can be designated; for example, changes in the relative position of the workpiece w and the irradiation point may be designated. For example, the machining path may be the trajectory of the irradiation point determined with respect to the front surface of the workpiece w. In addition, the machining path may be the trajectory along which the irradiation point actually moves, or may be a trajectory in the program or a trajectory in the command. Here, the surface of the workpiece w on which the laser beam is incident is referred to as the front surface. The surface opposite to the front surface is referred to as the back surface. Here, a portion of the machining path that forms the contour of a part is referred to as a contour line. The contour line is the boundary between the part and the remaining material. A portion of the machining path that is used for evaluating the machining state of the contour line is referred to as an evaluation path. In other words, a portion of the machining path that is used by the machining state evaluation unit 7 (described later) for determining the evaluation information EI for the contour line is referred to as an evaluation path. The evaluation path may include a portion different from the contour line, that is, a portion different from the boundary between the part and the remaining material.

Figure 2:
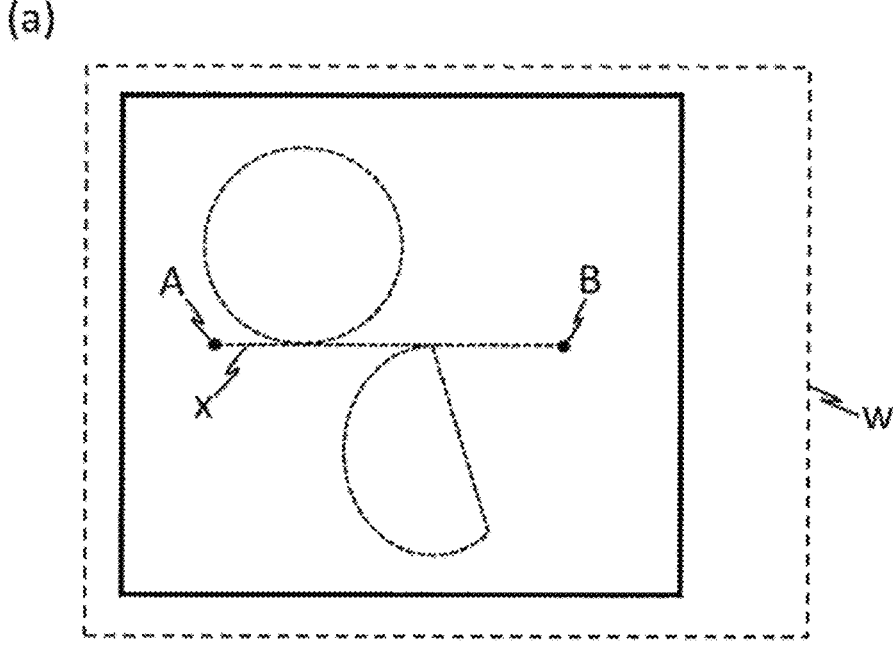
FIG. 2 is a diagram illustrating an example of a workpiece according to the present embodiment.
Figure 2:
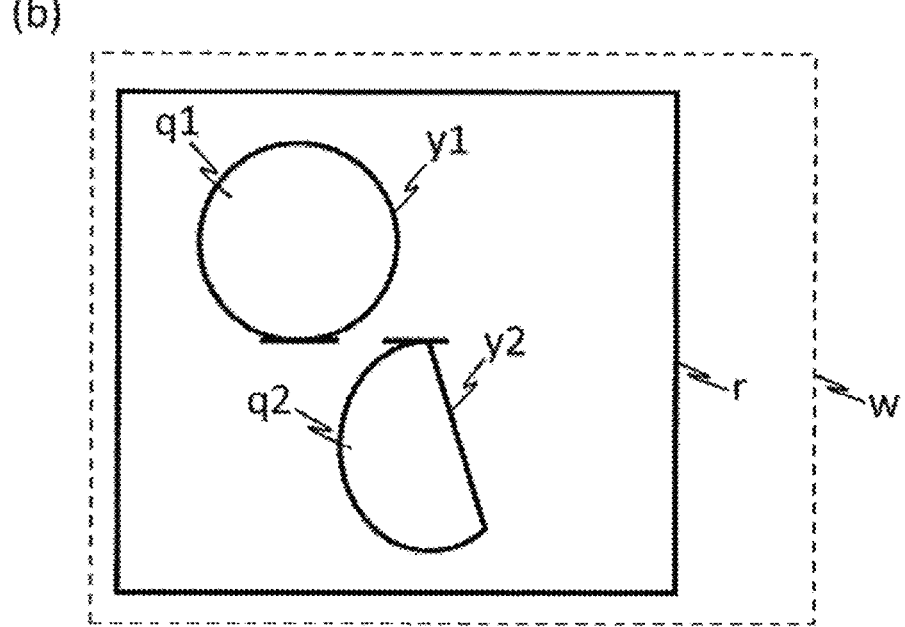

Below is an example of an evaluation path including a portion different from the contour line. FIG. 2 is a diagram illustrating an example of the workpiece w according to the present embodiment. The workpiece w in FIG. 2 is a rectangular soft steel material having a constant thickness. In FIG. 2(a), a machining path x along which machining is to be executed is indicated by a broken line. FIG. 2(b) illustrates an evaluation path y1, an evaluation path y2, a part q1, and a part q2. The machining state evaluation unit 7 (described later) determines the evaluation information EI for each of the contour lines of the part q1 and the part q2 based on the time-series signal ts acquired on the evaluation path y1 and the evaluation path y2. That is, the machining state evaluation unit 7 may determine the evaluation information EI by acquiring the time-series signal ts associated with the machining of the evaluation paths. The irradiation point moves from point A to point B in FIG. 2(a) along the machining path x. At point A, the irradiation of the workpiece w with the laser beam L is started, and piercing is executed so that a hole is formed through the workpiece w. Next, the irradiation point moves from point A to point B while the workpiece w is irradiated with the laser beam L. During this process, the irradiation point goes around the part q1 along a circular trajectory. Further, the irradiation point goes around the part q2 along a semicircular trajectory. In this manner, the workpiece w is cut into the part q1, the part q2, and the remaining material r. Note that the output of the laser beam L may be changed during the process in which the irradiation point moves along the machining path x. In addition, the output of the laser beam L for executing piercing and the output of the laser beam L for cutting may be different. As depicted in FIG. 2, the evaluation path y1 and the contour line of the part q1 do not match. Similarly, the evaluation path y2 and the contour line of the part q2 are not the same. That is, an evaluation path may include not only the boundary between the part and the remaining material but also a portion of the machining path close to the boundary between the part and the remaining material. Note that in the example of FIG. 2, the contour line of a part is a portion of the evaluation path, but conversely, the evaluation path may be a portion of the contour line.

Note that the control device 10 in FIG. 1 determines the oscillator command oc and the drive command dc based on a machining program mpa and machining conditions pc, but may determine the oscillator command oc and the drive command dc based on, for example, external input from an operator or the like. Here, the machining program mpa is a program that defines the shape of a part. The machining conditions pc are conditions for laser machining. The machining conditions pc may include, for example, pieces of information on the workpiece w, the laser oscillator 1, the optical path 2, the machining head 3, the drive unit 4, the workpiece w, and the like. Examples of information on the workpiece w can include the material, size, shape, and front surface state of the workpiece w. Examples of information on the laser oscillator 1 can include output, the current value of current supplied to the laser oscillator 1, pulse repetition frequency, the duty ratio of pulse output, pulse waveform, and wavelength. Examples of pieces of information on the optical path 2, the machining head 3, and the drive unit 4 can include information about the optical system 31, information on the focal position of the laser beam L, the concentration diameter of the laser beam L, the distance between the workpiece w and the machining head 3, the type of machining gas, the pressure of machining gas, the hole diameter of the nozzle 32, the shape of the nozzle 32, machining speed, and the environment of machining. Here, the machining speed may be the relative speed between the machining head 3 and the workpiece w. Examples of the environment of machining can include temperature and humidity.

The control device 10 in FIG. 1 determines position information li. The position information li is information designating a position on the machining path. The position information li may be a combination of position data pd and an identifier id. The position data pd may include a plurality of elements, and the elements may correspond to positions on the machining path on one-to-one basis. The identifier id may be information designating one or more of the plurality of elements. Furthermore, the identifier id may designate a range of elements from among the plurality of elements. For example, the above elements may be data points corresponding to positions on the machining path on one-to-one basis, and the position data pd may be a list of the data points. Examples of data points can include numbers assigned to positions included in the machining path, positions on the machining path represented by coordinates, values of distance from a reference point on the machining path, and the time when the irradiation point passes each position on the machining path. The identifier id may be information designating a portion of the series of data points in the list.

Here, a portion of the series of data points may be one position included in the machining path, a plurality of discrete positions, the range between two positions, or the like. In addition, as the position data pd, commands or programs such as the oscillator command oc, the drive command dc, a machining program, and a sorting program (described later) can be employed. Then, elements of the position data pd may be instructions, commands, or the like, and the identifier id may be information designating a portion of the series of elements. Note that the position information li is preferably associated with the oscillator command oc or the drive command dc. In addition, the control device 10 in FIG. 1 desirably generates the position information li in association with the oscillator command oc or the drive command dc. The association between the position information li and the oscillator command oc or the drive command dc makes it possible to more accurately designate parts, contour lines, and the like formed in accordance with the oscillator command oc and the drive command dc. Note that the position information li and the drive command dc can be considered to be associated with each other, when designating a position on the machining path with the position information li makes it possible to identify the drive command dc that specifies the machining of the position.

Here, the form of the identifier id and the position data pd is not limited. The position data pd may be a list of elements that is held in some form and from which an element in the list or elements in the list can be designated. In addition, the identifier id may be that with which one or more elements can be designated from the held list of elements. For example, the position data pd may be a string of data having data numbers and recorded in a storage device, in which case the identifier id may be a signal designating a data number, a range of data numbers, or the like. In addition, the position data pd may be the oscillator command oc, the drive command dc, the machining program mpa, or the like, in which case the identifier id may be a signal. The signal designates, an instruction regarding the machining of a desired position or a desired range on the machining path, a command regarding the machining of a desired position or a desired range on the machining path, or the like. In addition, the position data pd and/or the identifier id may be input in advance to the control device 10, the evaluation information storage unit 8, the sorting operation determination unit 9, the hand control device 12, and the like. Then, only the identifier id may be acquired and used in combination.

In the example of FIG. 1, the control device 10 determines the position information li, but the position information li can also be generated outside the laser machining system 1000. An example of such a configuration is that the machining program mpa is generated based on computer-aided design (CAD) shape data designating the shape of a part to be machined, and the identifier id for the contour line of the part is assigned in the machining program mpa outside the laser machining system 1000. Then, the machining program mpa may be used as the position data pd. Here, the assigned identifier id may be read by the control device 10. Note that computer-aided manufacturing (CAM) software may be used to create the machining program mpa. In addition, the CAM software may generate, from the CAD shape data, the machining program mpa that can be read by the control device 10.

During the execution of laser machining, the detection unit 6 observes the machining state in time series, and determines the observation result as the time-series signal ts. Examples of the machining state can include intensity, wavelength, frequency, or a combination thereof related to machining light, i.e. light generated by irradiating the workpiece w with the laser beam L, machining sound, i.e. sound generated by irradiating the workpiece w with the laser beam L, reflected light, i.e. the laser beam L reflected by the workpiece w, and the like. Here, machining sound may include ultrasound. Examples of the detection unit 6 can include a photodiode, a charge coupled device (CCD) sensor, a complementary metal oxide semiconductor (CMOS) sensor, a spectral spectrometer, an acoustic sensor, a vibration sensor, and a combination thereof.

Furthermore, the detection unit 6 may evaluate the machining state in more detail by detecting the state of the laser machining device 100 in addition to the machining state. Examples of the state of the laser machining device 100 can include the atmosphere around or inside the laser machining device 100, the position, speed, and acceleration of the workpiece w or the machining head 3, and the angular velocity of the motor included in the drive unit 4. Examples of sensors that observe the state of the laser machining device 100 can include a temperature sensor, a humidity sensor, an acceleration sensor, a gyro sensor, a distance sensor, and a position detector. By using these sensors, the evaluation information EI can be determined based on the machining sound, the machining light, and the state of movement of the workpiece. The detection unit 6 may include a plurality of or a plurality of types of sensors. In addition, the detection unit 6 may be placed at various positions. For example, the sensors constituting the detection unit 6 may be placed inside or outside the machining head 3, on the front surface side or the back surface side of the workpiece w, or the like. In addition, the detection unit 6 may be configured such that the light to be detected passes through an optical fiber and enters the sensor. By configuring the detection unit 6 using the above-described detection instruments, the evaluation information can be determined based on the machining sound, the machining light, the state of movement of the workpiece, and the like. Therefore, it is possible to more accurately observe, monitor, or assess the machining state.

The machining state evaluation unit 7 determines, as the evaluation information EI, a result of evaluating the machining state based on the time-series signal ts. The evaluation information storage unit 8 stores the contour line evaluation information E in which the evaluation information EI is associated with the contour line based on the position information li. Here, as described above, when the contour line of the part and the evaluation path of the part are different to each other, the machining state evaluation unit 7 determines the evaluation information EI for the contour line of the part based on the time-series signal ts for the evaluation path of the part. The machining state evaluation unit 7 may set a criterion for the machining state in advance, and determine the evaluation information EI including a judgment result j indicating whether the machining state is better or worse than the criterion. Below is an example of the judgment result j. If the part and the remaining material r are separable, the judgment result j may be determined to be good, and if the part and the remaining material r are inseparable, the judgment result j may be determined to be poor, so that it can be determined more quickly or more accurately whether the part and the workpiece w are separable. Here, the terms "separable" and "inseparable" respectively mean that the part can and cannot be taken out in the sorting device 200 (described later). The machining state evaluation unit 7 may divide the machining path into a plurality of sections, and determine the evaluation information EI for each section. The sections may be obtained by dividing the machining path at each certain distance or at each certain machining time. Alternatively, the sections may be obtained by dividing the machining path at the positions where the traveling direction of the irradiation point changes. Still alternatively, the sections may be obtained by dividing the machining path at the points where the shape of the machining path changes. Still alternatively, the sections may be set as follows. First, an evaluation value is determined for each position on the machining path. Then, the machining path may be divided into sections at the positions where there is a change exceeding a certain threshold in evaluation value. Moreover, the sections may be set using a combination of any of the above-described methods.

A line along the outer shape of a machined part on the machining path is referred to as the outer periphery of the part, and a line surrounding a cut-out portion inside the outer periphery of the part is referred to as the inner periphery. A contour line forming an outer peripheral portion and a contour line forming an inner peripheral portion are respectively referred to as an outer contour line and an inner contour line. The machining state evaluation unit 7 may determine the evaluation information EI for the outer contour line and the inner contour line, and the evaluation information storage unit 8 may store the contour line evaluation information E. This enables the sorting operation determination unit 9 (described later) to distinguish between the machining state related to the inner contour line and the machining state related to the outer contour line for use in the determination of sorting operation.

Further, the machining state evaluation unit 7 may determine the evaluation information EI including the degree of machining defect. In addition, the machining state evaluation unit 7 may determine the evaluation information EI including information identifying the machining defect item that has occurred. Then, the sorting device 200 may execute a sorting operation in which the parts are classified into more specific categories so as to improve the efficiency of the subsequent process. Examples of machining defect items can include burning, gouging, dross, flaws, upper surface roughness, middle surface roughness, lower surface roughness, oxide film peeling, and fading. Here, burning may be a phenomenon in which the workpiece w burns more intensely in the vicinity of the irradiation point of the laser beam L than during normal machining, resulting in through-holes, recesses, or the like in the workpiece w. Gouging may be a phenomenon in which when the laser beam does not pass to the back surface side of the workpiece w, a molten portion of the workpiece w is blown out to the front surface side of the subject. Dross may be a phenomenon in which a molten portion or the like adheres to a part. Flaws may be recesses, protrusions, or the like generated with respect to the machining path. Here, flaws may be generated on the cut surface, front surface, back surface, or the like of a part. Upper surface roughness, middle surface roughness, and lower surface roughness may be phenomena in which the front surface, cut surface, and back surface of the workpiece w get rough, respectively. Oxide film peeling may be a phenomenon in which an oxide film formed on a cut surface of the workpiece w is peeled off during machining, and an unoxidized front surface becomes exposed. Fading may be a phenomenon in which the cut surface of a machined part becomes discolored. In this manner, by evaluating the machining state according to the machining defect item, it is possible to execute sorting in which the parts are classified by the machining defect item that has occurred.

The machining state evaluation unit 7 may evaluate the degree of defect for each type of machining defect using a feature, or may evaluate the degree of machining defect using a feature. In addition, the machining state evaluation unit 7 may determine the evaluation information EI using the machining conditions pc. In addition, the machining state evaluation unit 7 may obtain one or more features from the time-series signal ts, and determine the evaluation information EI from the obtained features. For example, the average of one measurement value and the standard deviation of the measurement value may be obtained as features, and the evaluation information EI indicating the degree of machining defect may be determined from the average and the standard deviation. In addition, for example, the evaluation value of the evaluation information EI may be between zero and one, and the evaluation value may become larger as the machining state gets worse.

In addition, the machining state evaluation unit 7 may obtain a feature from the time-series signal ts through statistical analysis, frequency analysis, filter bank analysis, wavelet transform, or a combination thereof. Moreover, when determining the evaluation information EI, the machining state evaluation unit 7 may use a classifier approach for the feature obtained from the time-series signal ts. Examples of classifier approaches can include linear discriminant, logistic regression, support vector machines, relevance vector machines, and decision trees. In addition, the machining state evaluation unit 7 may use a regression approach when determining the evaluation information EI. Examples of regression approaches can include linear regression, polynomial regression, Bayesian linear regression, and Gaussian process regression. In addition, a clustering approach may be used for machining state evaluation. Examples of clustering approaches can include K-means algorithm, Gaussian mixture distribution, and Bernoulli mixture distribution. In addition, the machining state evaluation unit 7 may evaluate the machining state with an approach that uses a neural network. Examples of neural networks can include deep neural networks, convolutional neural networks, and recurrent neural networks. In addition, classification algorithms, clustering approaches, regression algorithms, or known approaches that are combinations thereof may be used.

The sorting operation determination unit 9 determines the sorting control command sc based on the contour line evaluation information E. The sorting control command sc is a command instructing the sorting device 200 to perform sorting operation. In the example of FIG. 1, the sorting operation determination unit 9 determines the sorting operation for M parts: parts p1 to pM. The hand control device 12 acquires the position information li, and determines the hand drive command hd based on the sorting control command sc and the position information li. A part to be subjected to sorting operation is referred to as a part to be sorted. The sorting operation determination unit 9 may acquire, as the contour line evaluation information E, the evaluation information EI for a plurality of sections included in the contour line of the part to be sorted. Then, the sorting control command sc may be determined from the average of the plurality of pieces of evaluation information EI. In addition, the sorting operation determination unit 9 may acquire the worst one of the plurality of pieces of evaluation information EI as the contour line evaluation information E, and determine the sorting control command sc. This enables the sorting operation determination unit 9 to determine the sorting control command sc based on the evaluation result of the section of the contour line having the worst machining state. Then, it is possible to avoid the stop of the laser machining system 1000, useless sorting operation, and the like.

In addition, in a case where the machining state evaluation unit 7 determines the evaluation information EI including the judgment result j for each section, the sorting operation determination unit 9 may determine the sorting control command sc based on the ratio of the sections having the good judgment result j to the sections included in the contour line of the part to be sorted. For example, the sorting operation determination unit 9 may execute sorting operation on the part to be sorted only when the ratio of the sections having the good evaluation information EI to the sections included in the part to be sorted exceeds a predetermined value. Alternatively, the sorting operation determination unit 9 may determine to execute sorting operation only when none of the sections included in the contour line of the part to be sorted have the poor judgment result j. In a case where the machining state evaluation unit 7 determines, as the evaluation information EI, the degree of defect according to the machining defect item that has occurred, the sorting operation determination unit 9 may determine the sorting control command sc for executing classification by the machining defect item that has occurred. Note that the sorting operation determination unit 9 may acquire the position information li and the contour line evaluation information E and determine the sorting control command sc based on the position information li, and the hand control device 12 may determine the hand drive command hd based on the sorting control command sc.

A display unit 11 acquires display information di and shows the display information di to an operator or the like. The display information di may be information on laser machining, that is, information about the laser machining device 100, information on sorting operation, information on the sorting device 200, and the like. As illustrated in FIG. 1, the display unit 11 may acquire information on the status of machining from the control device 10, and may acquire information on the status of sorting from the sorting device 200. Note that the display unit 11 may be a human-machine interface for operating the control device 10. Here, the human-machine interface is a connection that is located between a human and a machine and transmits instructions, information, and the like. For example, in FIG. 1, the machining program mpa and the machining conditions pc are input to the control device 10 from outside, but the display unit 11 may be a touch panel so that designation of the machining program mpa, input of the machining conditions pc, display of the machining status, and the like are executed via the display unit 11. Note that the display unit 11 may be provided in the sorting device 200, and the display unit 11 may be omitted from the laser machining system 1000. The display unit 11 displays information on machining, sorting, and the like and enables operators, supervisors, users, and the like to recognize the information.

The hand drive unit 13 changes the position of the hand 14 based on the hand drive command hd. The hand drive unit 13 switches between a gripping state in which the hand 14 grips an object and a non-gripping state in which the hand does not grip an object based on the hand drive command hd. Here, a position where a part is cut out from the workpiece w through machining is referred to as a gripping position. A target position to which a part is to be moved in sorting operation is referred to as a sorting position. Examples of the hand drive unit 13 can include a servo control device including a motor and a position detector, and a robot arm. Examples of the hand drive unit 13 can also include a gate-shaped frame including the hand 14 that can be shifted in the directions of three axes orthogonal to each other, and a vertical articulated robot including the hand 14. Examples of the hand 14 can include a vacuum suction pad, a clamp, a gripper, a permanent magnet, and an electromagnet. Note that in the present disclosure, operations such as attraction with a magnet and vacuum suction are also referred to as gripping.

After laser machining is finished, the pallet 5 conveys the workpiece w from the laser machining device 100 to the sorting device 200. FIG. 1 illustrates the pallets 5 with which machining and sorting operation are being executed in the laser machining device 100 and the sorting device 200. The number of pallets 5 may be one or more. Note that the sorting device 200 may be placed inside the laser machining device 100, and the hand 14 provided in the sorting device 200 may grip a part on the pallet 5 and move the part to the parts yard 16. The remaining material r and the part pn+1 in the sorting device 200 of FIG. 1 are represented by their cross-sections. In addition, the part pn is being sorted and gripped by the hand 14. The part pn+1 has finished being machined and is waiting for sorting operation to be executed. The parts p1 to pn−1 have finished being machined and sorted and have been placed in the parts yard 16. The parts pn+2 to pM are not in the cross-section of the workpiece w illustrated in FIG. 1, and thus are not illustrated. Note that the parts p1 to pM may be either different or identical in size, shape, and the like.

Figure 3:
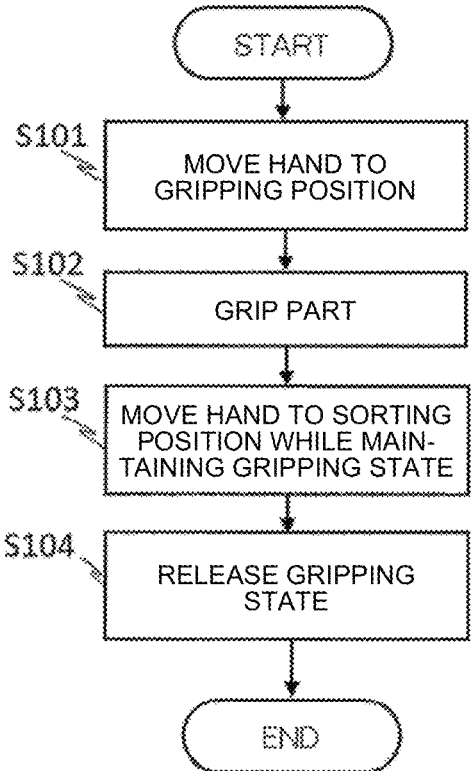
FIG. 3 is a flowchart illustrating an example of sorting operation according to the present embodiment.

FIG. 3 is a flowchart illustrating an example of sorting operation according to the present embodiment. In step S101, the hand drive unit 13 moves the hand 14 to a gripping position. In step S102, the hand 14 grips the part located at the gripping position. In step S103, the hand drive unit 13 moves the hand 14 from the gripping position to the sorting position while maintaining the gripping state. In step S104, the hand 14 releases the gripping state and transitions to the non-gripping state. The part is placed at the sorting position in the parts yard 16. The above is an example of sorting operation.

Figure 4:
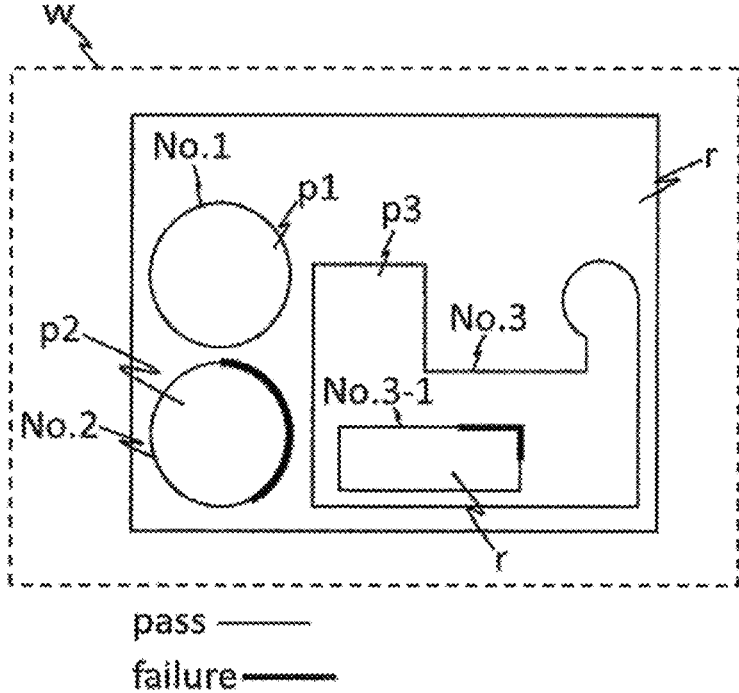
FIG. 4 is a diagram illustrating an example of a workpiece according to the first embodiment.

FIG. 4 is a diagram illustrating an example of the workpiece w according to the present embodiment. Shown inside the workpiece w of FIG. 4 are three parts: a part p1, a part p2, and a part p3. Here, the part p1 and the part p2 each have an outer contour line but do not have an inner contour line. The part p3 has an outer contour line and an inner contour line. The outer contour lines of the part p1, the part p2, and the part p3 have the identifiers id of No. 1, No. 2, and No. 3, respectively. The inner contour line of the part p3 has the identifier id of No. 3-1. The part p3 is in contact with a portion of the remaining material r via the contour line of the identifier No. 3. The part p3 is also in contact with another portion of the remaining material r via the contour line of the identifier No. 3-1.

Figures 5, 6:
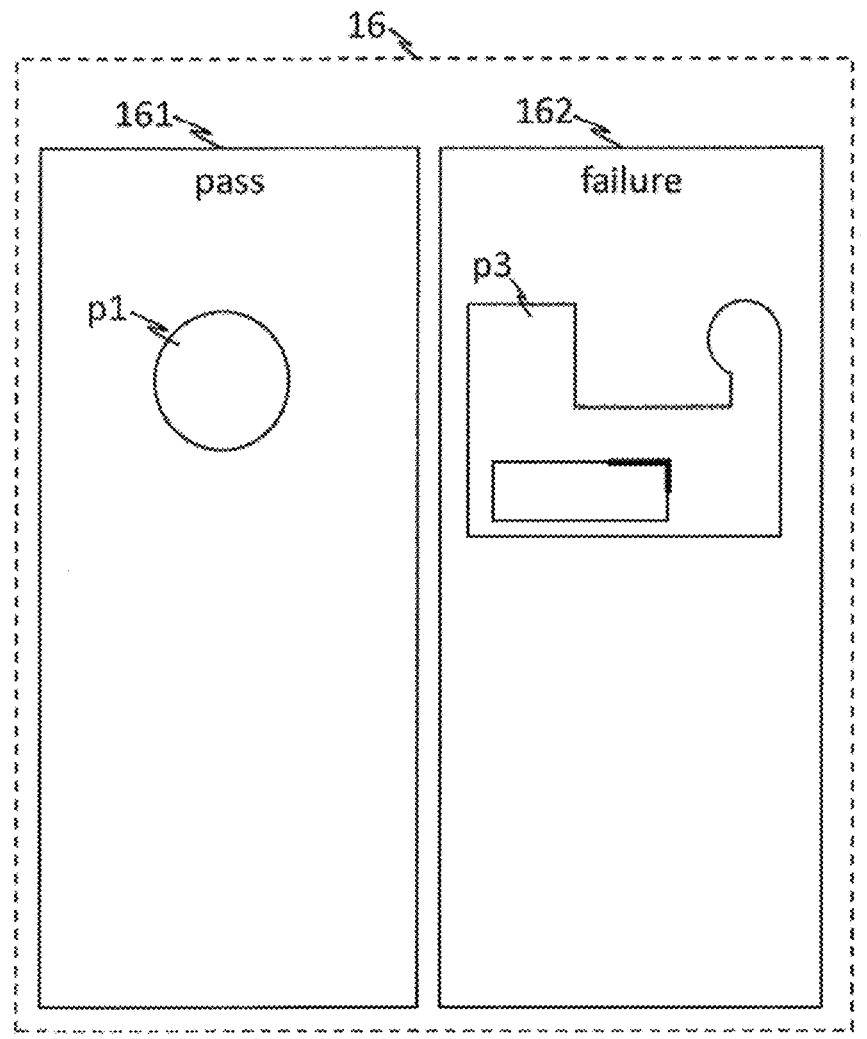
FIG. 5 is a diagram illustrating an example of contour line evaluation information according to the first embodiment.
FIG. 6 is a diagram illustrating an example of a parts yard according to the first embodiment.

FIG. 5 is a diagram illustrating an example of contour line evaluation information according to the present embodiment. The evaluation information EI in FIG. 5 includes the judgment result j. When the evaluation information EI of a section is good, it means that the remaining material r and the part are separable at the target contour line by executing sorting operation. When the evaluation information EI is poor, it means that the remaining material r and the part are inseparable. In the machining path illustrated in FIG. 4, it is assumed that the sections included in thin solid line portions have the evaluation information EI that is good. It is also assumed that the sections included in thick solid line portions have the evaluation information EI that is poor. FIG. 5 illustrates the identifiers id and the evaluation information EI corresponding to the identifiers id. In FIG. 5, the contour lines that show a good result of machining as a whole are indicated by "pass". On the other hand, the contour lines including a section that shows a poor result of machining are indicated by "failure". In FIG. 5, the evaluation information EI corresponding to No. 1 and No. 3 is pass, and the evaluation information EI corresponding to No. 2 and No. 3-1 is failure.

FIG. 6 is a diagram illustrating an example of a parts yard according to the present embodiment. FIG. 6 illustrates a state obtained after the operation of sorting the parts included in the workpiece w in FIG. 4 is executed. The parts yard 16 illustrated in FIG. 6 includes a non-defective yard 161 in which non-defective parts are placed and a defective yard 162 in which defective parts are placed. The part p1 graded pass is placed in the non-defective yard 161. The part p3 graded failure is placed in the defective yard 162. The evaluation information EI of the outer contour line of the part p2 is poor and the part p2 cannot be taken out; therefore, the part p2 is not moved to the parts yard 16 and is not illustrated in FIG. 6. Note that the form of the parts yard 16 is not limited as long as parts can be placed therein according to the sorting results. For example, an open cabinet having a plurality of shelves, or a plurality of boxes may be used. In addition, the remaining material r may also be subjected to sorting operation and classified into three types: non-defective, defective, and remaining material r. Consequently, the remaining material r can be easily discarded.

Figure 7:
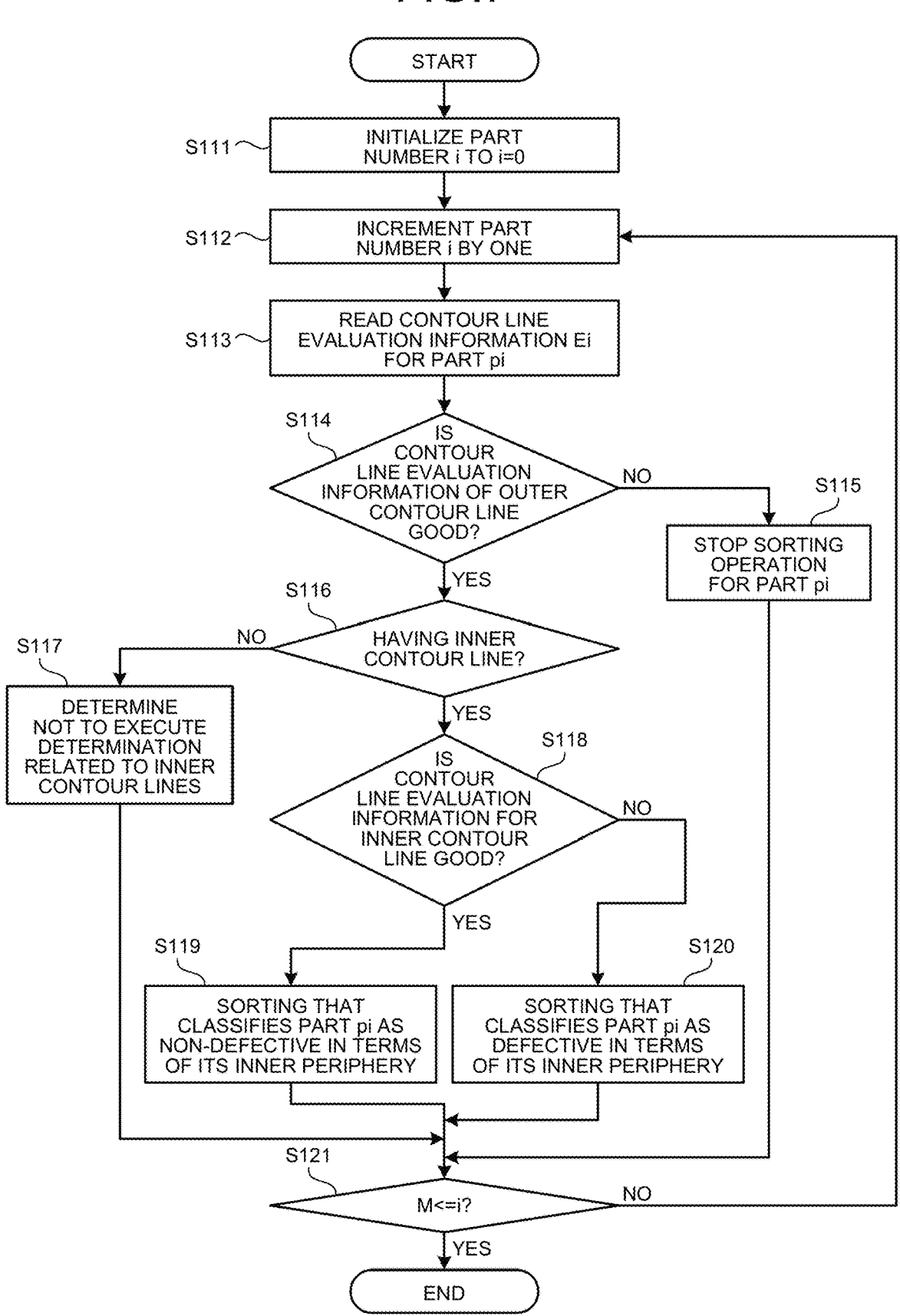
FIG. 7 is a flowchart illustrating an example of the operation of a sorting operation determination unit according to the first embodiment.

FIG. 7 is a flowchart illustrating an example of the operation of the sorting operation determination unit 9 according to the present embodiment. An exemplary operation procedure for the laser machining system 1000 will be described with reference to FIG. 7. The operation example in FIG. 7 is based on the premise that the evaluation information storage unit 8 stores the contour line evaluation information E before the start of the operation procedure. In addition, the sorting operation determination unit 9 determines sorting operation in terms of the M parts: parts p1 to pM. Here, the parts to be sorted are assigned part numbers, and the part with the part number i is denoted by pi. In addition, in a case where a part has an inner periphery and an outer periphery, the evaluation information storage unit 8 stores the evaluation information EI for both the inner contour line and the outer contour line as the contour line evaluation information E. In step S111, the sorting operation determination unit 9 initializes the part number i. For example, as illustrated in FIG. 7, the part number i may be set to zero. In step S112, the sorting operation determination unit 9 increments the part number i by one. In step S113, the sorting operation determination unit 9 reads, from the evaluation information storage unit 8, contour line evaluation information Ei which is the contour line evaluation information E of the part pi. Subsequently, in step S114, the sorting operation determination unit 9 determines whether the contour line evaluation information E of the outer contour line among the contour line evaluation information E of the part pi is good or poor. In response to determining that the contour line evaluation information E is good, the operation proceeds to step S116. On the other hand, in response to determining that the contour line evaluation information E is poor, the operation proceeds to step S115. For example, the sorting operation determination unit 9 operates as follows when executing step S114 on the workpiece w in FIG. 4. For the part p1 and the part p3, the contour line evaluation information E of the outer contour line is determined to be good, and the operation proceeds to step S116. On the other hand, for the part p2, the contour line evaluation information E of the outer contour line is determined to be poor, and the operation proceeds to step S115.

In step S115, the sorting operation determination unit 9 determines to stop the sorting operation for the part pi, and proceeds to step S121. In step S116, the sorting operation determination unit 9 determines whether the part pi has an inner contour line. The sorting operation determination unit 9 may acquire the machining program mpa in advance, and execute the determination in step S116 based on the machining program mpa. In step S116, in response to determining that the part pi has an inner contour line, the sorting operation determination unit 9 proceeds to step S118. On the other hand, in response to determining in step S116 that the part pi does not have an inner contour line, the sorting operation determination unit 9 proceeds to step S117. In step S117, the sorting operation determination unit 9 determines not to execute the determination related to inner contour lines for the part pi, and proceeds to step S121. For example, the operation of executing step S116 on the workpiece w illustrated in FIG. 4 is as follows. The sorting operation determination unit 9 determines that the part p1 does not have an inner contour line, proceeds to step S117, and determines in S117 not to execute the determination related to inner contour lines. The sorting operation determination unit 9 determines that the part p3 has an inner contour line, and proceeds to step S118.

In step S118, the sorting operation determination unit 9 determines whether the contour line evaluation information E for the inner contour line is good or poor, that is, whether the machining state is good or poor. In response to determining in step S118 that the contour line evaluation information E for the inner contour line is good, the operation proceeds to step S119. In step S119, the sorting operation determination unit 9 determines to execute sorting that classifies the part pi as non-defective in terms of the contour line evaluation information E for the inner contour line, that is, classifies the part pi as non-defective in terms of its inner periphery, and the operation proceeds to step S121. In response to determining in step S118 that the contour line evaluation information E for the inner contour line is poor, the operation proceeds to step S120. In step S120, the sorting operation determination unit 9 determines to execute sorting that classifies the part pi as defective in terms of the contour line evaluation information E for the inner contour line, that is, classifies the part pi as defective in terms of its inner periphery, and the operation proceeds to step S121. For example, the operation of step S118 on the workpiece w illustrated in FIG. 4 is as follows. The sorting operation determination unit 9 determines that the contour line evaluation information E for the inner contour line of the part p3 is poor, and proceeds to step S120. Then, in step S120, the sorting operation determination unit 9 determines to perform sorting by classifying the part p3 as defective in terms of the contour line evaluation information E for the inner contour line, and proceeds to step S121.

In step S121, the sorting operation determination unit 9 determines whether the part number i is equal to or greater than M. As described above, M is the largest part number i. In response to determining in step S121 that the part number i is less than M, the operation proceeds to step S112. Then, the sorting operation determination unit 9 repeatedly executes the operation procedure of steps S112 to S121 until determining in step S121 that the part number i is equal to or greater than M. In response to determining in step S121 that the part number i is equal to or greater than M, the sorting operation determination unit 9 completes the determination of sorting operation for the workpiece w. The above is an example of the operation procedure of the sorting operation determination unit 9 illustrated in FIG. 7. The sorting operation determination unit 9 may determine the sorting operations for the parts p1 to pM based on the contour line evaluation information E, and determine the sorting control command sc including commands for these sorting operations, or may determine the sorting control command sc individually for each part. Note that the flowchart of FIG. 7 shows an exemplary case where one part has one inner contour line. However, in a case where one part has a plurality of inner contour lines, conditional branches may be provided for each inner contour line.

Because the sorting operation determination unit 9 according to the present embodiment determines the sorting control command sc based on the contour line evaluation information E, it is possible to reflect the association between the part and the evaluation of the machining state of the contour line of the part in the determination of the sorting control command sc. Therefore, for example, when the remaining material r and the part are inseparable, it is possible to determine not to execute the sorting operation for the part. Thus, even when the remaining material and the part are inseparable due to a defect, the sorting device 200 can continue sorting operation. In addition, operator assistance can be reduced, and laser machining and sorting operation can be executed more automatically or autonomously. Moreover, the amount of inspection required for sorting operation after completion of laser machining can be reduced.

Further, the machining state evaluation unit 7 according to the present embodiment determines the evaluation information EI, and the evaluation information storage unit 8 stores contour line evaluation information in which the evaluation information EI is associated with the contour line. Therefore, the sorting operation determination unit 9 can reflect the machining state of each contour line, the machining state of each part, and the like in the classification of sorting operation. Thus, the laser machining system 1000 can execute efficient sorting.

In addition, the machining state evaluation unit 7 may determine the contour line evaluation information E including information for identifying the inner contour line and the outer contour line. Then, the sorting operation determination unit 9 may reflect the information for identifying the inner contour line and the outer contour line of the part in the determination of sorting operation. In addition, the machining state evaluation unit 7 may determine the evaluation information EI indicating the evaluation of the machining state in terms of the machining defect item, and the sorting operation determination unit 9 may determine the sorting control command sc for classifying the part by the machining defect item that has occurred. In addition, the machining state evaluation unit 7 may determine the contour line evaluation information E including information indicating whether the remaining material r and the part are separable, and the sorting operation determination unit 9 may determine the sorting control command sc indicating that sorting operation is not to be executed for the inseparable part. In addition, the machining state evaluation unit 7 may determine the evaluation information EI including the degree of machining defect, and the sorting operation determination unit 9 may determine the sorting control command sc specifying that the part is to be classified according to the degree of machining defect. In addition, the machining state evaluation unit 7 may determine the contour line evaluation information E including information indicating to what extent the machining defect in each part can be alleviated through post-processing such as additional machining. Then, the sorting operation determination unit 9 may determine the sorting control command sc specifying that the parts are to be classified into those to be subjected to post-processing and those not to be subjected to post-processing. Consequently, the efficiency of the subsequent process including post-processing may be improved.

With the above-described configurations or operations, the laser machining system 1000 can perform sorting more efficiently. In addition, finer sorting can be executed. It is also possible to configure a sorting device capable of operating more automatically or autonomously by determining whether to execute sorting operation before executing sorting operation. In addition, the laser machining system 1000 can reduce the time and effort required for the subsequent process.

Figure 8:
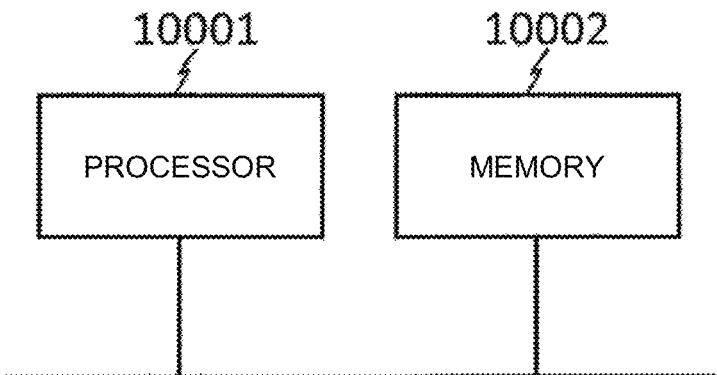
FIG. 8 is a diagram illustrating an exemplary configuration in which a processing circuitry provided in the laser machining system according to the first embodiment is configured by a processor and a memory.

FIG. 8 is a diagram illustrating an exemplary configuration in which processing circuitry provided in the laser machining system 1000 according to the present embodiment is configured by a processor 10001 and a memory 10002. In a case where the processing circuitry is configured by the processor 10001 and the memory 10002, each function of the processing circuitry of the laser machining system 1000 is implemented by software, firmware, or a combination of software and firmware. Software, firmware, or the like is described as a program and stored in memory 10002. In the processing circuitry, the processor 10001 reads and executes the program stored in the memory 10002, thereby implementing the functions. That is, the processing circuitry includes the memory 10002 for storing the programs using which the processing of the laser machining system 1000 is executed as a result. It can also be said that these programs cause a computer to execute the procedures and methods for the laser machining system 1000.

The processor 10001 may be a central processing unit (CPU), a processing device, an arithmetic device, a microprocessor, a microcomputer, or a digital signal processor (DSP). The memory 10002 may be a non-volatile or volatile semiconductor memory such as a random access memory (RAM), a read only memory (ROM), a flash memory, an erasable programmable ROM (EPROM), or an electrically EPROM (EEPROM, registered trademark). Alternatively, the memory 10002 may be a magnetic disk, a flexible disk, an optical disk, a compact disk, a mini disk, or a digital versatile disc (DVD).

Figure 9:
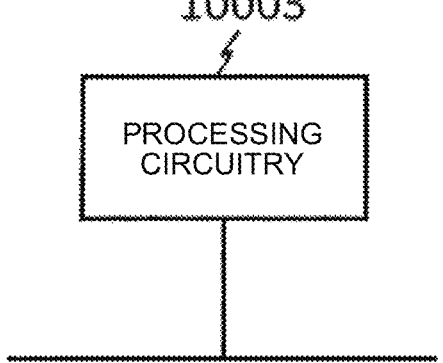
FIG. 9 is a diagram illustrating an exemplary configuration in which a processing circuitry provided in the laser machining system according to the first embodiment is configured by dedicated hardware.

FIG. 9 is a diagram illustrating an exemplary configuration in which processing circuitry provided in the laser machining system 1000 according to the present embodiment is configured by dedicated hardware. In a case where the processing circuitry is configured by dedicated hardware, the processing circuitry 10003 illustrated in FIG. 9 may be, for example, a single circuit, a composite circuit, a programmed processor, a parallel programmed processor, an application specific integrated circuit (ASIC), a field programmable gate array (FPGA), or a combination thereof. The functions of the laser machining system 1000 may be implemented by different processing circuitries 10003, or a plurality of functions may be collectively implemented by one processing circuitry 10003. The place where the processing circuitry is installed is not limited to the inside of the laser machining device 100, the sorting device 200, or the like. For example, the processing circuitry may be located away from the laser machining device 100 and the sorting device 200, and the processing circuitry may be connected to the laser machining device 100 and the sorting device 200 via a network. In addition, for example, the machining state evaluation unit 7, the evaluation information storage unit 8, the sorting operation determination unit 9, the control device 10, the hand control device 12, and the like may be implemented by processing circuitry. Then, the machining state evaluation unit 7 may be located inside or near the laser machining device 100 or the sorting device 200. Note that the components of the laser machining system 1000 are not limited to the configuration of FIG. 1. For example, the laser oscillator 1, the optical path 2, the machining head 3, the drive unit 4, the pallet 5, the sorting device 200, and the like may be provided outside the laser machining system 1000.

As described above, positions on the machining path, machining state evaluations, and sorting operation determinations can be associated with each other using the position information li. Then, sorting operation can be executed more efficiently or more accurately according to the contour line evaluation information E. According to the present embodiment, it is possible to provide a laser machining system capable of efficiently executing the operation of sorting parts cut out through laser cutting. In addition, it is possible to provide a laser machining system capable of automatically sorting parts without stopping processing even when a defect occurs during laser cutting. Note that by associating the position information li with the oscillator command oc or the drive command dc, the contour line and the evaluation information may be associated with each other so that sorting operation can be accurately determined.

Second Embodiment

Figure 10:
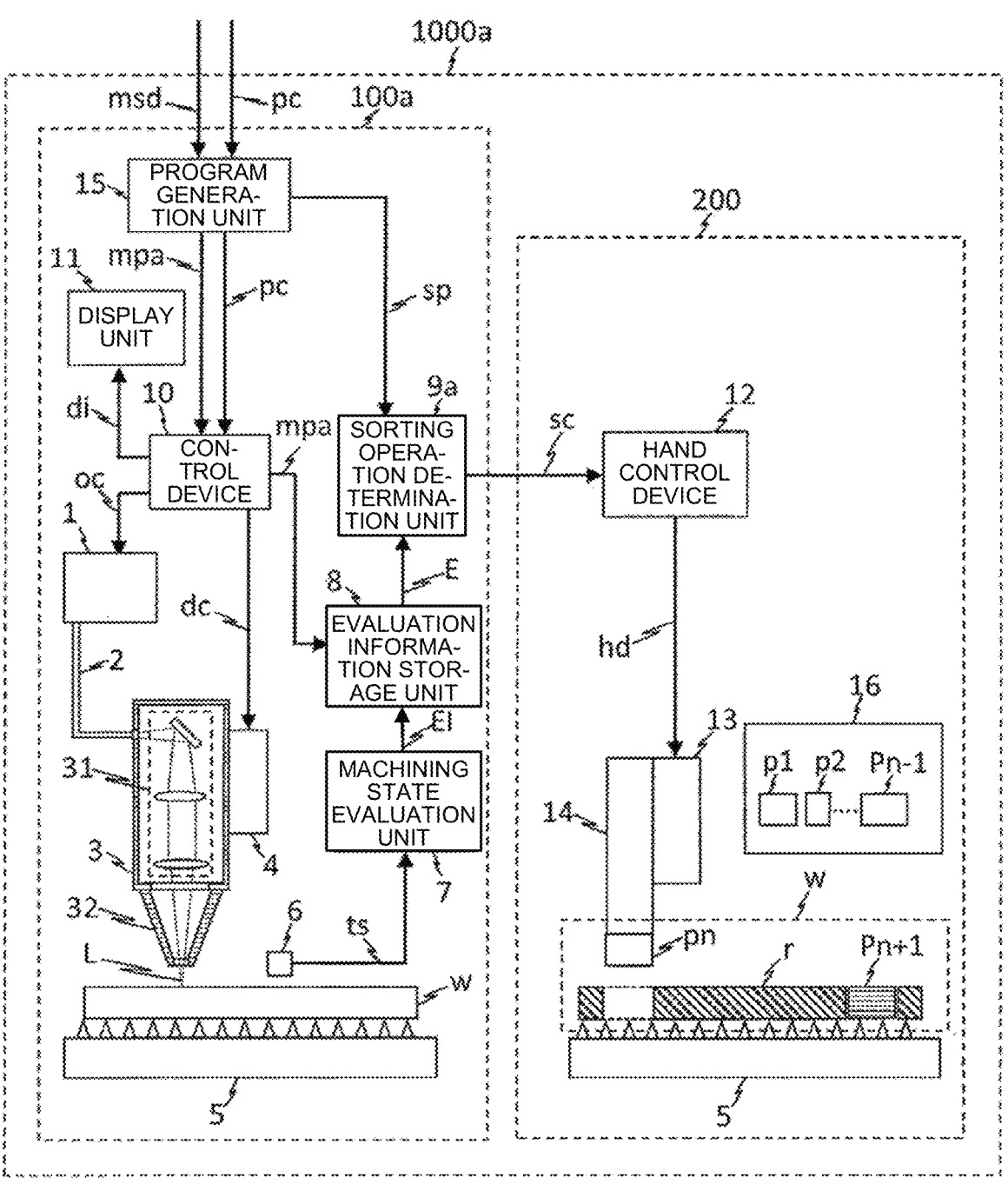
FIG. 10 is a diagram illustrating an exemplary configuration of a laser machining system according to a second embodiment.

FIG. 10 is a diagram illustrating an exemplary configuration of a laser machining system according to the present embodiment. The laser machining system 1000a includes a program generation unit 15 in addition to the components of the laser machining system 1000 according to the first embodiment, and includes a sorting operation determination unit 9a instead of the sorting operation determination unit 9. The sorting operation determination unit 9 in FIG. 1 determines the sorting control command sc based on the contour line evaluation information E. On the other hand, the sorting operation determination unit 9a in FIG. 10 determines the sorting control command sc based on the contour line evaluation information E and a sorting program sp. In the description of FIG. 10, components identical or corresponding to those in FIG. 1 are denoted by the same reference signs.

The program generation unit 15 generates the machining program mpa and the sorting program sp based on machining shape data msd. The machining program mpa and the sorting program sp are assigned identifiers id by the program generation unit 15. In the laser machining system 1000a illustrated in FIG. 10, the machining program mpa, the sorting program sp, and the identifiers id are used as the position information li. By respectively using the machining program mpa and the sorting program sp, the evaluation information storage unit 8 and the sorting operation determination unit 9a associate a part to be sorted with the evaluation result of the contour line of the part to be sorted.

Here, the program generation unit 15 may be, for example, a processing device that operates based on computer-aided manufacturing (CAM) software. In addition, the machining shape data msd may be, for example, data called computer-aided design (CAD) data. The machining shape data msd may be data describing the shape of a part to be cut out from the workpiece w through machining. Note that the machining program mpa and the sorting program sp are desirably associated with the oscillator command oc or the drive command dc.

FIG. 11 is a flowchart illustrating an example of an operation in which the program generation unit 15 generates the machining program mpa according to the present embodiment. In step S201, the program generation unit 15 designates, based on the machining shape data msd, the number of parts to be machined and the position of the parts in the workpiece w. In step S202, the program generation unit 15 generates a machining path based on the number and position of parts designated in step S201. For example, the program generation unit 15 may set a coordinate system for the workpiece w, and generate a machining path using the set coordinate system. In step S203, the program generation unit 15 divides the machining path into contour lines. The program generation unit 15 may further determine evaluation paths, sections, and the like. In step S204, the program generation unit 15 assigns each contour line the identifier id. Note that the machining program mpa may include information for identifying inner contour lines and outer contour lines. Here, the program generation unit 15 may assign the identifier id to each part to be sorted using a method similar to that of the control device 10 according to the first embodiment. Steps S202 to S204 may be executed in a different order, or may be executed simultaneously. The above is an example of the operation procedure in which the program generation unit 15 generates the machining program mpa.

Note that in the present embodiment, the combination of the machining program mpa and the identifiers id and the combination of the sorting program sp and the identifiers id are used as the position information li. In FIG. 10, because the machining program mpa has the identifiers id assigned, the identifiers id are not illustrated together with the machining program mpa. When determining the oscillator command oc and the drive command dc based on the machining program mpa, the control device 10 associates the machining program mpa and the identifiers id with the oscillator command oc or the drive command dc. In other words, the control device 10 executes machining according to the machining program mpa and the identifiers id by determining the oscillator command oc or the drive command dc. That is, the parts and contour lines are formed according to the machining program mpa and the identifiers id.

Figure 12:
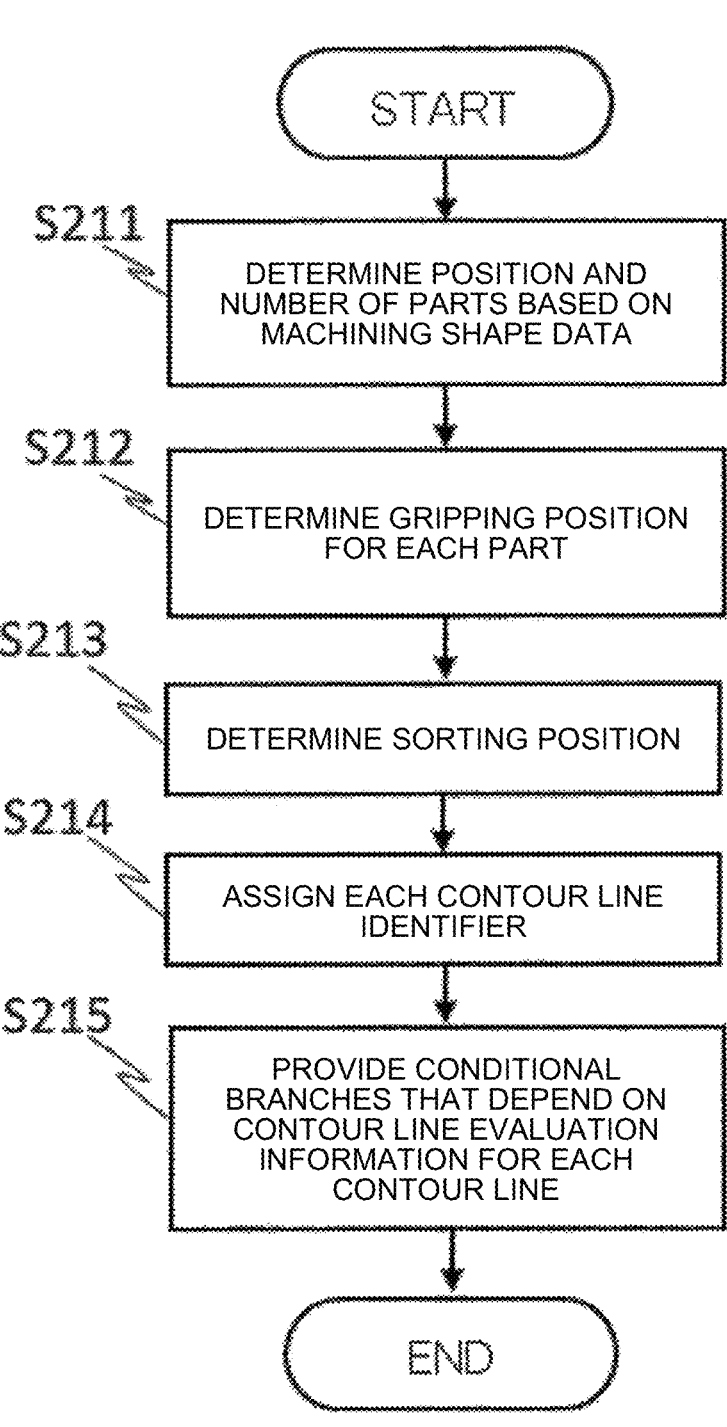
FIG. 12 is a flowchart illustrating an example of an operation in which the program generation unit generates a sorting program according to the second embodiment.

FIG. 12 is a flowchart illustrating an example of an operation in which the program generation unit 15 generates the sorting program sp according to the present embodiment. In step S211, the program generation unit 15 determines the position and number of parts based on the machining shape data msd. In step S212, the program generation unit 15 determines a gripping position for each part. In step S212, for example, the program generation unit 15 may set a coordinate system for the workpiece w, and determine the position of each part using the coordinate system. In step S213, the program generation unit 15 determines a sorting position for each part based on the position of each part determined in step S211. For example, the gripping position may be the position of the hand 14 at which the hand 14 grips the part. In step S213, the program generation unit 15 determines the sorting position.

In step S214, the program generation unit 15 assigns the identifier id to a portion of the sorting program sp specifying the machining of each contour line. That is, the contour lines are assigned the identifiers id. Here, the identifiers id assigned to the sorting program sp are desirably associated with the identifiers id assigned to the machining program mpa. In other words, in the machining program mpa and the sorting program sp, the portions corresponding to the same contour line are desirably assigned the same identifier id. By assigning the contour lines the identifiers id, the parts on which sorting operation is to be executed are associated with the machining state of the contour lines included in the parts, and the association can be used for the determination of sorting operation. In step S215, the program generation unit 15 provides conditional branches that depend on the contour line evaluation information E for each contour line in the sorting program sp. The conditional branches that depend on the contour line evaluation information E may be configured such that, for example, a plurality of options of sorting operation are provided in the sorting program sc, and the sorting operation determination unit 9a selects a sorting operation from among the options according to the contour line evaluation information E. By providing conditional branches, sorting operation can be changed according to the contour line evaluation information E. In addition, the sorting program sp may include information for identifying inner contour lines and outer contour lines. Furthermore, the conditional branches may be provided for each part. The above is an example of the operation of generating a sorting program. The order of generating the sorting program sp illustrated in FIG. 12 is merely an example, and the order of steps S211 to S215 may be changed as necessary, or some or all of the steps may be executed simultaneously.

Note that the sorting operation determination unit 9a according to the present embodiment uses the sorting program sp and the identifiers id as the position information li. In FIG. 10, because the sorting program sp has the identifiers id assigned, the identifiers id are not illustrated together with the sorting program sp. When determining sorting operation, the sorting operation determination unit 9a associates a part to be sorted, its contour line, and the contour line evaluation information E using the sorting program sp and the identifiers id.

In addition, the evaluation information storage unit 8 acquires, as the position information li, the machining program mpa and the identifiers id generated by the program generation unit 15. The evaluation information storage unit 8 stores the contour line evaluation information E in which the evaluation information EI is associated with the contour line based on the position information li. In addition, the sorting operation determination unit 9a acquires, as the position information li, the sorting program sp and the identifiers id generated by the program generation unit 15. The sorting operation determination unit 9a determines the sorting control command sc based on the position information li. Note that in the example of FIG. 10, the sorting operation determination unit 9a acquires the sorting program sp and the identifiers id as the position information li, but as in the example of FIG. 1 according to the first embodiment, the hand control device 12 may acquire the position information li and determine the hand drive command hd based on the sorting control command sc and the position information li.

As described above, according to the present embodiment, it is possible to provide a laser machining system capable of efficiently executing the operation of sorting parts cut out through laser cutting. In addition, it is possible to provide a laser machining system capable of automatically sorting parts without stopping work even when a defect occurs during laser cutting. The laser machining system 1000a includes the program generation unit 15, and the program generation unit 15 generates the machining program mpa and the sorting program sp based on the machining shape data msd and the machining conditions pc. In the laser machining system 1000a illustrated in FIG. 10, the machining program mpa, the sorting program sp, and the identifiers id are used as the position information li. Then, a position on the machining path is designated using the position information li, and the contour line of a part, the evaluation result of the contour line of the part, and the sorting operation for the part are associated with each other, so that the evaluation of the machining state and the determination of the sorting operation can be linked. Then, sorting operation can be executed more efficiently or more accurately according to the contour line evaluation information E.

Third Embodiment

Figure 13:
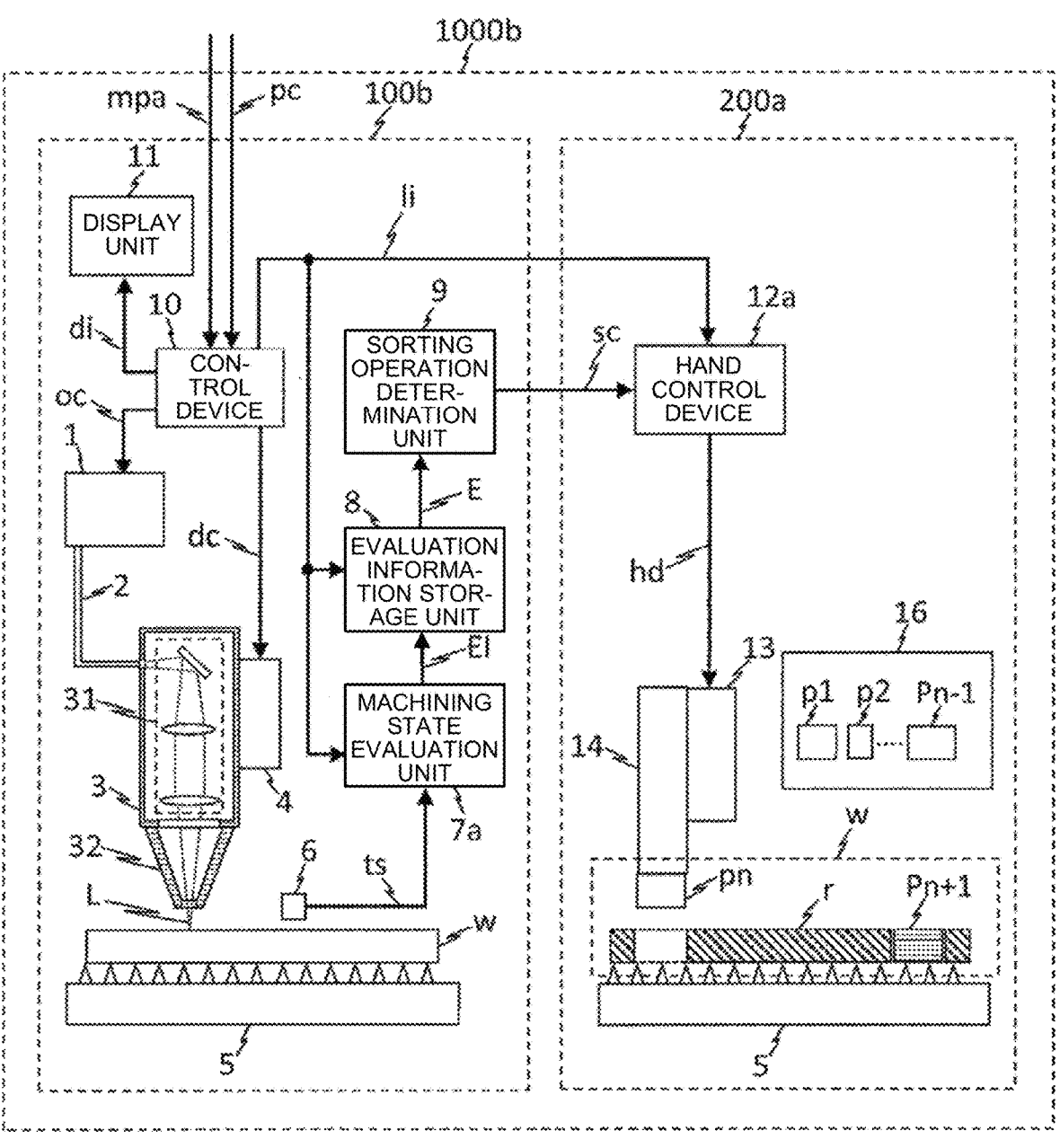
FIG. 13 is a diagram illustrating an exemplary configuration of a laser machining system according to a third embodiment.

FIG. 13 is a diagram illustrating an exemplary configuration of a laser machining system according to the present embodiment. The laser machining system 1000b illustrated in FIG. 13 includes a laser machining device 100b and a sorting device 200a. The laser machining device 100b includes a machining state evaluation unit 7a instead of the machining state evaluation unit 7 illustrated in FIG. 1 according to the first embodiment. The sorting device 200a includes a hand control device 12a instead of the hand control device 12 illustrated in FIG. 1. In the description of FIG. 13, components identical or corresponding to those in FIG. 1 according to the first embodiment are denoted by the same reference signs as in FIG. 1.

Figure 14:
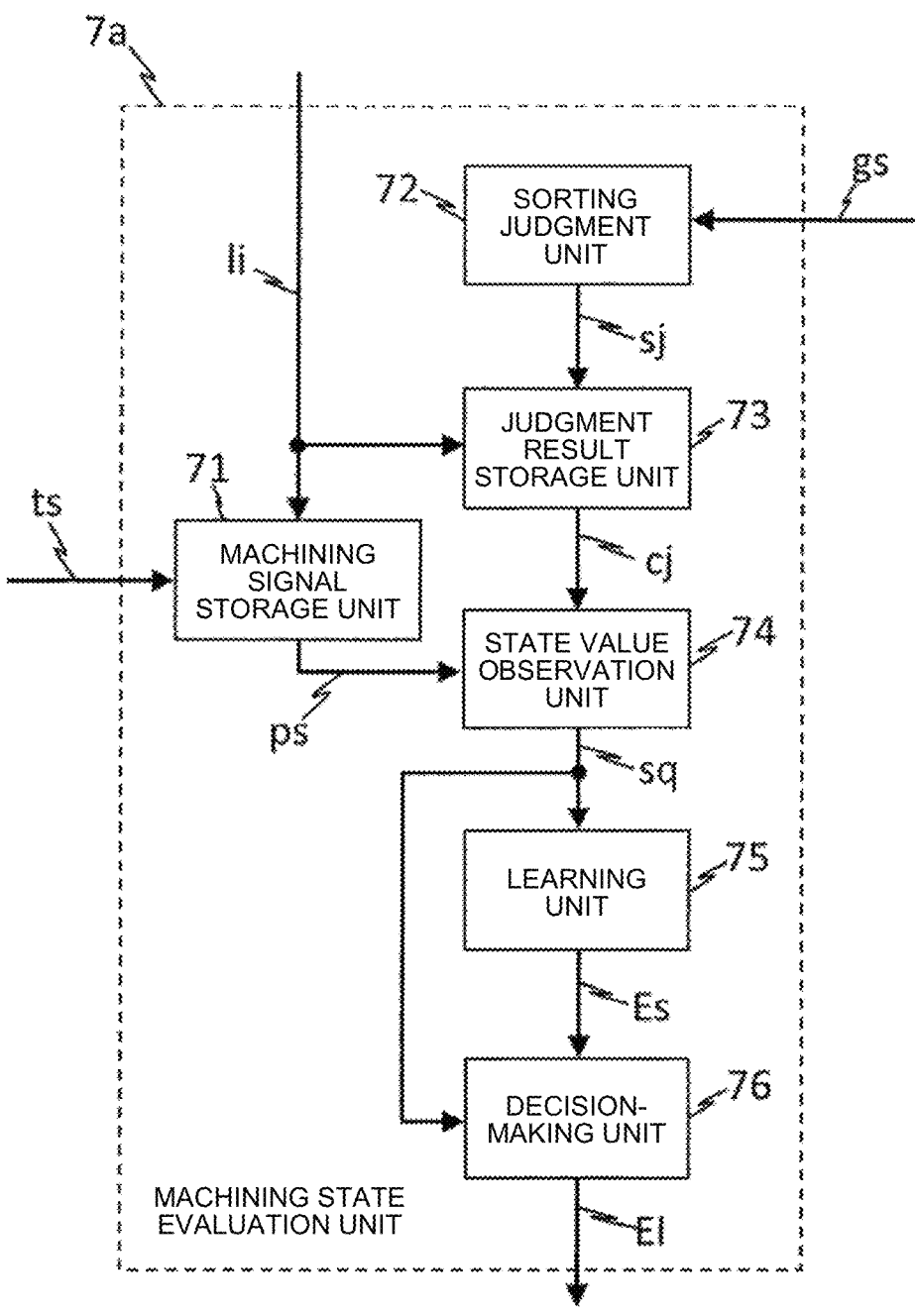
FIG. 14 is a block diagram illustrating an exemplary configuration of a machining state evaluation unit according to the third embodiment.

FIG. 14 is a block diagram illustrating an exemplary configuration of the machining state evaluation unit according to the present embodiment. The machining state evaluation unit 7a illustrated in FIG. 14 includes a machining signal storage unit 71 that stores a machining signal ps, a sorting judgment unit 72 that determines a sorting judgment result sj, and a judgment result storage unit 73 that stores a contour line judgment result cj. The machining state evaluation unit 7a further includes a state value observation unit 74 that observes state values sq, a learning unit 75 that executes learning, and a decision-making unit 76 that determines the evaluation information EI.

The machining signal storage unit 71 acquires the time-series signal ts and the position information li, and stores the machining signal ps in which the time-series signal ts or a feature generated from the time-series signal ts is associated with the contour line based on the position information li. The sorting judgment unit 72 judges whether the extraction of a part has succeeded or failed based on gripping state information gs. When associating the gripping state information gs with the part, the sorting judgment unit 72 may acquire the hand drive command hd, and use the hand drive command hd in addition to the position information li or instead of the position information li. The result of the judgment is referred to as the sorting judgment result sj. Here, an operation in which the hand 14 grips a part and moves the part from the gripping position is referred to as extraction. Examples of cases where the extraction of a part fails can include a case where the part and the remaining material r are joined by adhesive melt or the like, a case where the part and the remaining material r are not completely cut off from each other, and the like. The judgment result storage unit 73 stores the contour line judgment result cj in which the sorting judgment result sj is associated with the contour line based on the position information li. The judgment result storage unit 73 desirably associates the sorting judgment result sj with the contour line of the part that is the subject of the judgment or the outer contour line of the part that is the subject of the judgment.

The hand control device 12a in FIG. 13 determines the gripping state information gs, in addition to performing the operation of the hand control device 12 in FIG. 1. The gripping state information gs is information that is used when the sorting judgment unit 72 determines the success or failure of the extraction. Below is an example of the operation of the hand control device 12a and the operation of the sorting judgment unit 72. The hand control device 12a stores in advance the weight of a part as a part weight, calculates the difference between the weight of the object actually gripped by the hand 14 and the part weight, and sets the ratio of the absolute value of the difference and the stored part weight as the gripping state information gs. The sorting judgment unit 72 may determine that the extraction of the part with the hand 14 has succeeded only when the value of the gripping state information gs is equal to or less than a predetermined threshold. Here, the weight of the object actually gripped by the hand 14 can also be estimated from the driving force, torque, or the like generated by the hand drive unit 13. Note that the part weight can also be calculated from the volume, specific gravity, and the like calculated from the shape of the part. For example, the part weight may be calculated from the plate thickness of the workpiece w, the specific gravity of the workpiece w, and the area of the portion surrounded by the contour line of the part. As another example, the weight of an object that can be gripped by the hand 14 is set to a value between the weight of the part, and the total value of the weight of the part and the weight of the remaining material r. Then, information indicating whether the hand 14 is in a gripping state may be determined as the gripping state information gs.

Note that the sorting judgment unit 72 may acquire the gripping state information gs from a device or the like different from the hand control device 12a. An example of such a device is a sensor that determines the gripping state information gs. For example, in a case where the gripping mechanism of the hand 14 is a vacuum suction pad, a sensor that detects the flow rate of air through the vacuum suction pad may be employed. In addition, the sensor may be a switch that switches between conduction and non-conduction depending on whether the hand 14 is in a gripping state or a non-gripping state. In addition, a distance sensor that detects the distance between the gripping mechanism of the hand 14 and a part may be employed. In addition, a proximity sensor that detects whether there is an object within the range of a predetermined distance may be employed. In addition, a light source that emits light such as a light emitting diode (LED) may be employed in combination with an optical sensor that detects the presence or absence of an object using reflected light from the object. In addition, a camera that captures an image of the gripping mechanism of the hand 14 may be employed as the sensor.

Figure 15:
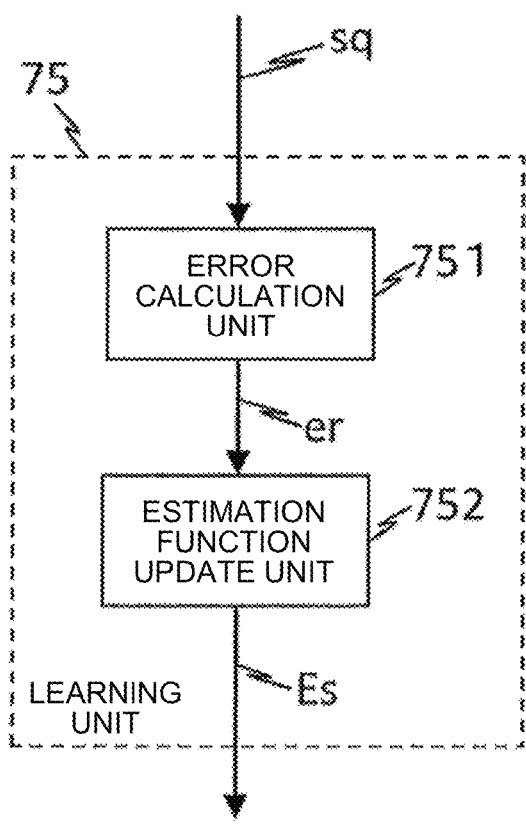
FIG. 15 is a block diagram illustrating an exemplary configuration of a learning unit according to the third embodiment.

The state value observation unit 74 observes the state values sq. Here, the state values sq are values including the machining signal ps and the contour line judgment result cj and related to laser machining or sorting operation. The learning unit 75 executes learning for estimating or determining the contour line judgment result cj from the machining signal ps based on the state values sq. The learning unit 75 can execute learning using various learning algorithms. For example, well-known learning algorithms such as reinforcement learning, supervised learning, unsupervised learning, and semi-supervised learning can be applied. As an example, a case where the learning unit 75 learns an estimation function Es that outputs the contour line judgment result cj in response to the input of the machining signal ps will be described. FIG. 15 is a block diagram illustrating an exemplary configuration of the learning unit 75 according to the present embodiment. The learning unit 75 includes an error calculation unit 751 that calculates an error er, and an estimation function update unit 752 that updates the estimation function Es based on the error er. Here, the error er is the error between an estimated value of the contour line judgment result cj and an actual measurement value of the contour line judgment result cj. The estimation function update unit 752 updates the estimation function Es so as to reduce the error er based on the state values sq.

Figure 16:
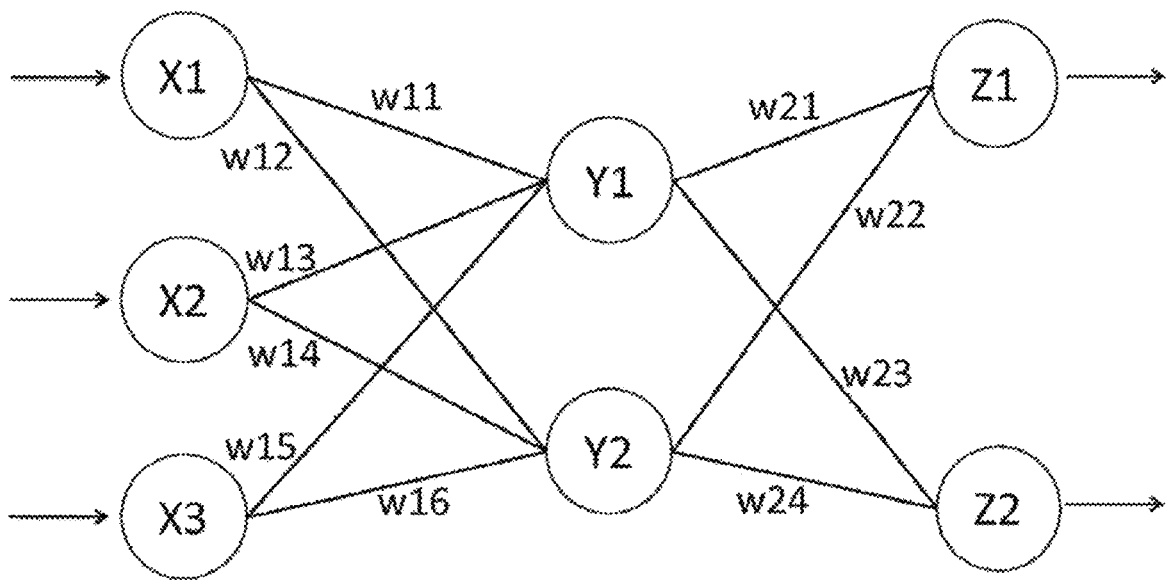
FIG. 16 is a diagram illustrating an exemplary configuration of a neural network according to the third embodiment.

In addition, the learning unit 75 may learn the relationship between the contour line judgment result cj and the machining signal ps through supervised learning using a neural network model. Here, a model that provides a large number of input-result (label) data pairs to a learning device to learn features in those data sets and estimate results from inputs is called supervised learning. FIG. 16 is a diagram illustrating an exemplary configuration of a neural network according to the present embodiment. The neural network includes an input layer composed of a plurality of neurons, an intermediate layer (hidden layer) composed of a plurality of neurons, and an output layer composed of a plurality of neurons. The number of intermediate layers may be one, or may be two or more.

For ease of explanation, the neural network in FIG. 16 has three inputs and three layers. When a plurality of inputs are input to the input layer composed of X1 to X3, the input values are multiplied by weights W1, i.e. w11 to w16, and the resultant values are input to the intermediate layer composed of Y1 and Y2. Further, the input values to the intermediate layer are multiplied by weights W2, i.e. w21 to w24, and the resultant values are output from the output layer that is composed of Z1 and Z2. This output result varies depending on the values of the weights W1 and the values of the weights W2. The neural network illustrated in FIG. 16 learns the relationship between the machining signal ps and the contour line judgment result cj through supervised learning according to the data set created based on the state values sq. That is, the learning unit 75 adjusts the weights W1 and the weights W2 so as to reduce the error between the contour line judgment result cj output from the output layer in response to the input of the machining signal ps and the contour line judgment result cj actually obtained. In a case where the learning unit 75 executes learning using the neural network model, the decision-making unit 76 may acquire, from the learning unit 75, the neural network model obtained as the result of executing the learning.

Figure 17:
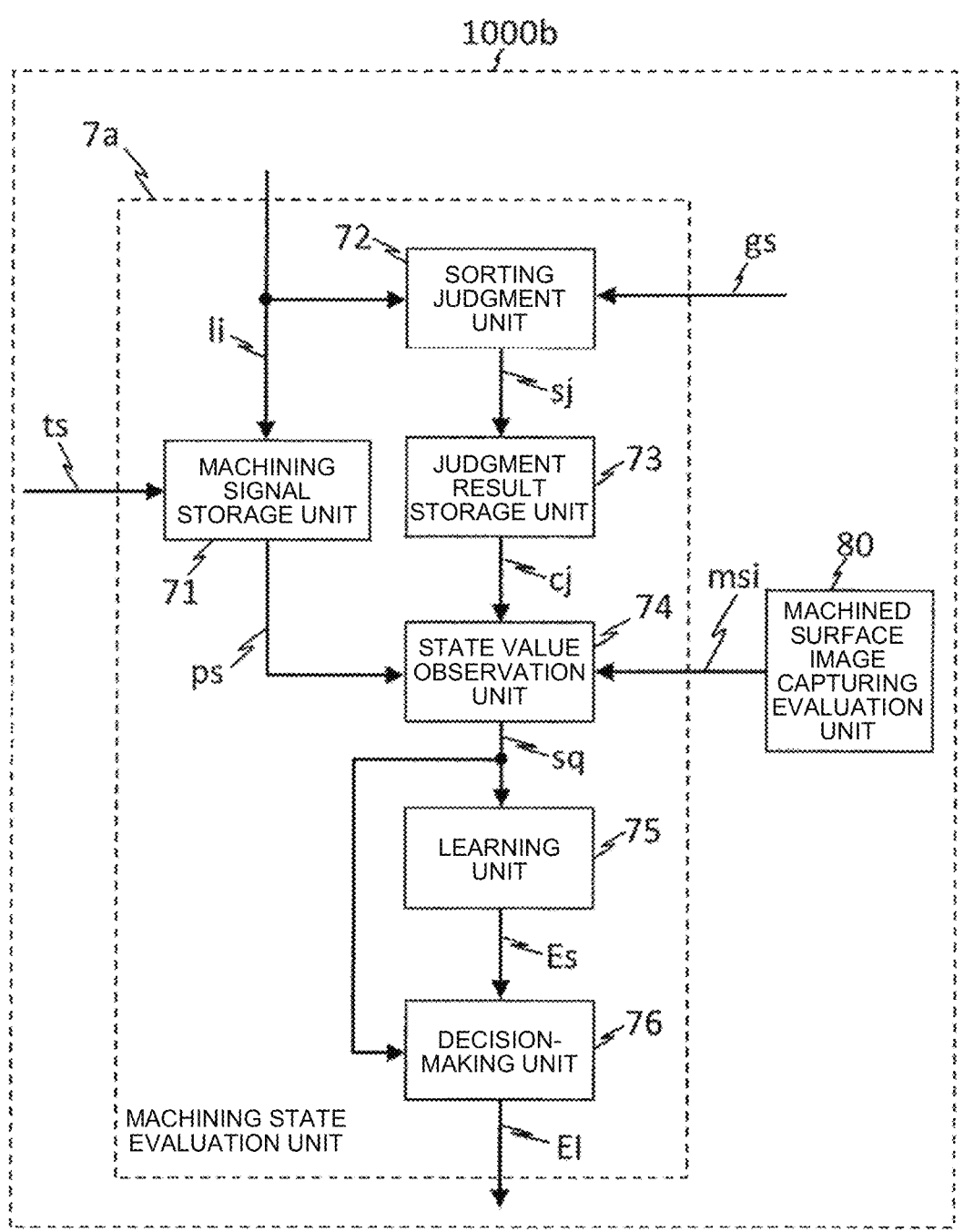
FIG. 17 is a block diagram illustrating an exemplary configuration of the machining state evaluation unit according to the third embodiment.

In addition to the machining signal ps and the contour line judgment result cj, the state value observation unit 74 may observe other values as the state values sq. For example, the state values sq may include values related to the state of the workpiece w, the state of the laser machining device 100, the state of the sorting device 200, and the like. FIG. 17 is a block diagram illustrating an exemplary configuration of the machining state evaluation unit according to the present embodiment. In FIG. 17, components identical or corresponding to those in FIG. 14 are denoted by the same reference signs as in FIG. 14. The laser machining system 1000b in FIG. 17 includes a machined surface image capturing evaluation unit 80. The machined surface image capturing evaluation unit 80 captures an image of a machined surface of a part, analyzes the captured image, and evaluates the state of the machined surface. Then, the evaluation result is determined as machined surface image information msi. Examples of the state of a machined surface can include the presence or absence of machining defect, the type of generated machining defect, that is, machining defect item, and the degree of machining defect. The state value observation unit 74 observes, as the state values sq, the machined surface image information msi in addition to the machining signal ps and the contour line judgment result cj. Then, the learning unit 75 executes learning for determining the contour line judgment result cj from the machining signal ps based on the state values sq including the machined surface image information msi. The learning unit 75 can use the machined surface image information msi for learning. Then, the decision-making unit 76 can more accurately determine the contour line judgment result cj and the evaluation information EI by using the result of learning with the use of the machined surface image information msi. Note that among the state values sq, the machining signal ps for the parts on which sorting operation is to be executed is desirably acquired before the determination of the sorting operation. In addition, the machined surface image capturing evaluation unit 80 may be a component of the laser machining system 1000b. In addition, the capture and analysis of machined surface images by the machined surface image capturing evaluation unit 80, input related thereto, and the like may be partially performed by an operator or the like.

The learning unit 75 may learn a model that executes the output of the contour line judgment result cj in response to the input of the machining signal ps. Examples of models that the learning unit 75 learns can include a classification model that distinguishes between success and failure, and a regression model that labels success as one and failure as zero. In addition, a model that can make a more accurate determination may be learned by using the machining conditions pc as part of the set of state values sq. For example, the state value observation unit 74 may observe the machining conditions pc associated with contour lines as part of the set of state values sq.

As described above, according to the present embodiment, it is possible to provide a laser machining system capable of efficiently executing the operation of sorting parts cut out through laser cutting. In addition, it is possible to efficiently separate the remaining material r and the parts in sorting operation. In addition, it is possible to provide a laser machining system capable of automatically or autonomously sorting parts without stopping sorting operation even when a defect occurs during laser cutting.

Furthermore, the laser machining system 1000b includes the learning unit 75. The learning unit 75 executes learning for determining the contour line judgment result cj from the machining signal ps, based on the state values sq that include the machining signal ps and the contour line judgment result cj and is related to laser machining or sorting operation. Therefore, the evaluation information EI can be determined quickly or accurately using the result of learning. In addition, by learning the relationship between the contour line judgment result cj and the machining signal ps, it is possible to more accurately estimate the success or failure of sorting operation, extraction, and the like from the state values sq. In addition, the machining signal storage unit 71 that stores the machining signal ps enables the learning unit 75 to execute learning using more data.

Fourth Embodiment

Figure 18:
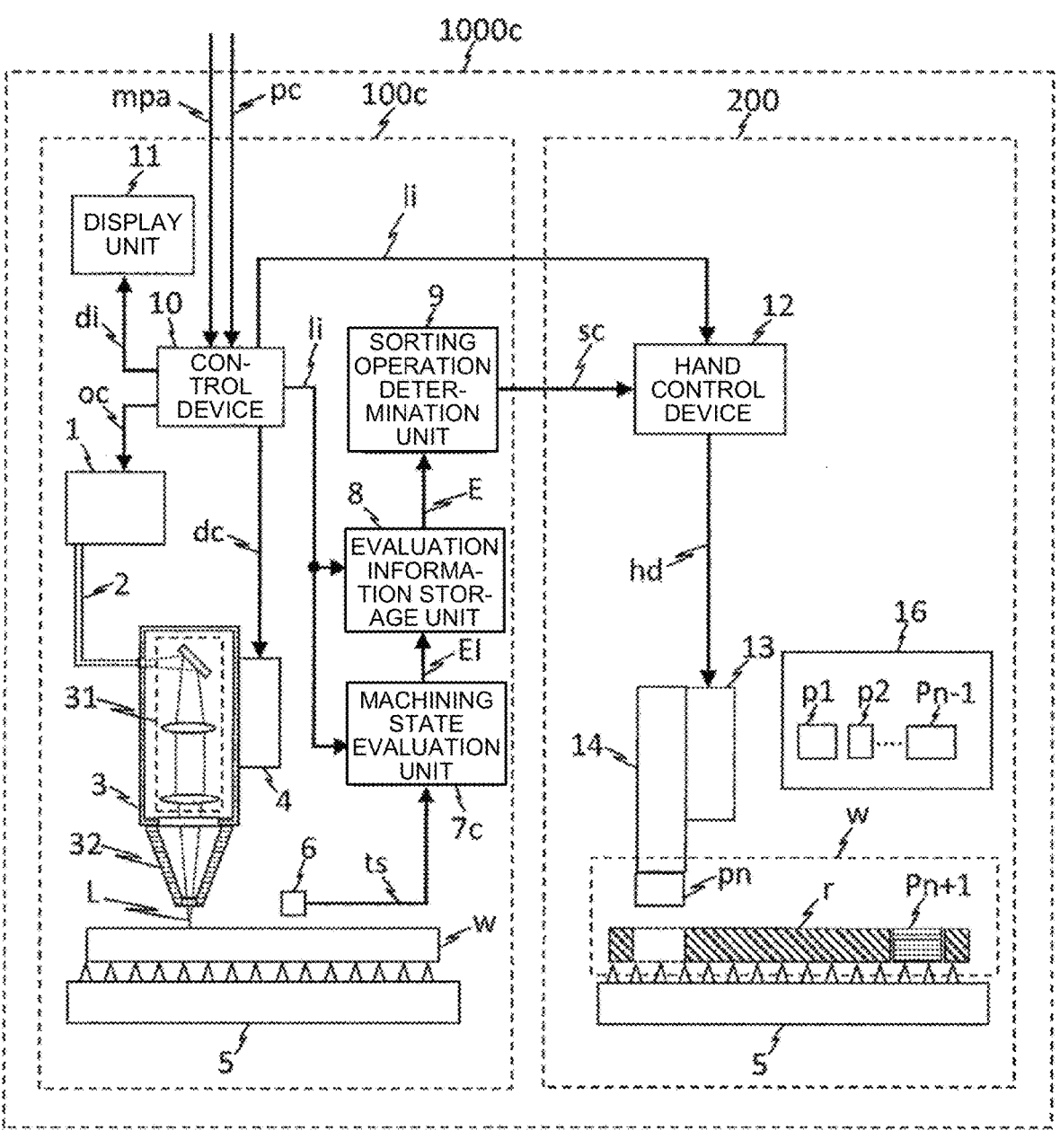
FIG. 18 is a diagram illustrating an exemplary configuration of a laser machining system according to a fourth embodiment.
Figure 19:
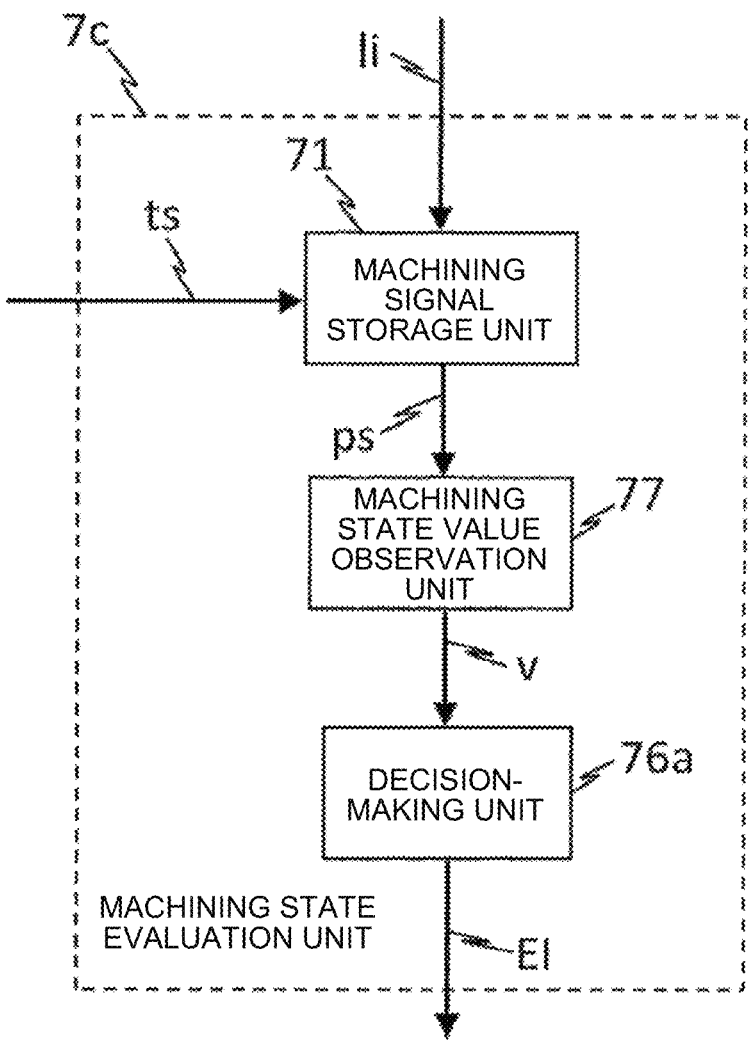
FIG. 19 is a block diagram illustrating an exemplary configuration of a machining state evaluation unit according to the fourth embodiment.

FIG. 18 is a diagram illustrating an exemplary configuration of a laser machining system according to the present embodiment. The laser machining system 1000c illustrated in FIG. 18 includes a laser machining device 100c and the sorting device 200. The laser machining device 100c includes a machining state evaluation unit 7c instead of the machining state evaluation unit 7 illustrated in FIG. 1 according to the first embodiment. The machining state evaluation unit 7c includes a learned learning machine that has already executed the learning described with reference to FIGS. 13 and 14. FIG. 19 is a diagram illustrating an example of the machining state evaluation unit according to the present embodiment. The machining state evaluation unit 7c includes the machining signal storage unit 71, a machining state value observation unit 77, and a decision-making unit 76a. In FIG. 19, components identical or corresponding to those in FIG. 14 are denoted by the same reference signs.

The machining state value observation unit 77 in FIG. 19 observes, as machining state values v, values including the machining signal ps and related to machining or sorting. The machining state values v may also include any value included in the state values sq other than the judgment result cj and the machining signal ps. Next, the decision-making unit 76a has the estimation function Es on which the learning unit 75 in FIG. 14 has executed update through learning. This learned estimation function Es or the decision-making unit 76a may be regarded as a learned learning machine. The decision-making unit 76a determines the judgment result cj and the evaluation information EI from the machining signal ps based on the machining state values v. Note that a learned learning machine that has executed learning using the machined surface image information msi from the machined surface image capturing evaluation unit 80 as illustrated in FIG. 17 in the third embodiment may be configured.

As described above, according to the present embodiment, it is possible to provide a laser machining system capable of efficiently executing the operation of sorting parts cut out through laser cutting. In addition, it is possible to efficiently separate the remaining material r and the parts in sorting operation. In addition, it is possible to provide a laser machining system capable of automatically or autonomously sorting parts without stopping sorting operation even when a defect occurs during laser cutting.

Furthermore, the laser machining system 1000c includes the decision-making unit 76a that is a learned learning machine. Therefore, the machining state evaluation unit 7c can determine the contour line judgment result cj and the evaluation information E from the machining state values v using the result of learning without executing learning. Then, by using the learned learning machine, it is possible to apply the result of learning to another laser machining system different from the laser machining system that has executed the learning. Thus, it is possible to provide laser machining systems capable of implementing efficient sorting operation by saving time in which each of the laser machining systems individually executes learning.

REFERENCE SIGNS LIST

1 laser oscillator; 4 drive unit; 6 detection unit; 7, 7a, 7c machining state evaluation unit; 8 evaluation information storage unit; 9, 9a sorting operation determination unit; 10 control device; 11 display unit; 15 program generation unit; 71 machining signal storage unit; 72 sorting judgment unit; 73 judgment result storage unit; 74 state value observation unit; 75 learning unit; 76, 76a decision-making unit; 77 machining state value observation unit; 1000, 1000a, 1000b, 1000c laser machining system; dc drive command; E contour line evaluation information; E1 evaluation information; id identifier; L laser beam; li position information; mpa machining program; oc oscillator command; pd position data; ps machining signal; r remaining material; sc sorting control command; sj sorting judgment result; sq state value; ts time-series signal; v machining state value; w workpiece.

The invention claimed is:

1. A laser machining system comprising:
processing circuitry
to control a laser oscillator and a driver and execute machining to cut a workpiece into a first part, a second part, and a remaining material, the laser oscillator being configured to emit a laser beam, the driver being configured to move, along a machining path, an irradiation point at which the workpiece is irradiated with the laser beam;
to determine a time-series signal that is a result of observing a state of the workpiece, on which the machining to cut the workpiece into the first part, the second part, and the remaining material along the machining path is executed, in a time series;
to determine evaluation information, that is a result of evaluation on a state of the machining for each of sections obtained by dividing the machining path on which the machining to cut the workpiece into the first part, the second part, and the remaining material along the machining path is executed, using the time-series signal;
to store contour line evaluation information in which a contour line is associated with the evaluation information for each section of the machining path, the contour line being a boundary between a respective one of the first part and the second part and the remaining material;

to determine a sorting control command based on the contour line evaluation information, the sorting control command being a command for controlling a sorting operation; and after the machining to cut the workpiece into the first part, the second part, and the remaining material along the machining path is executed, to perform the sorting operation according to the sorting control command including that:

when the contour line evaluation information corresponding to the first part is poor and the contour line evaluation information corresponding to the second part is good, the first part is taken out from a first position where the workpiece is machined and moved to a target position for defective parts and then the second part is taken out from a second position where the workpiece is machined and moved to a target position for non-defective parts, and the sorting operation for one of the first part and the second part is skipped when the contour line evaluation information for an outer contour line of the one of the first part and the second part indicates that the outer contour line of the one of the first part and the second part is judged to be poor, wherein, when the first part has the outer contour line, which is a contour of an outer periphery of the first part, and an inner contour line, which is a contour of an inner periphery of the first part, the processing circuitry determines the evaluation information for each of the outer contour line and the inner contour line, and determines the sorting control command such that:

(i) when both the state of the machining for the outer contour line and the state of the machining for the inner contour line are judged to be good, the sorting operation is performed in such a manner that the first part is taken out from the first position where the workpiece is machined and moved to the target position for non-defective parts, and (ii) when the state of the machining for the outer contour line is judged to be good and the state of the machining for the inner contour line is judged to be poor, the sorting operation is performed in such a manner that the first part is taken out from the first position where the workpiece is machined and moved to the target position for defective parts.

2. The laser machining system according to claim 1, wherein the processing circuitry associates the contour line with the evaluation information using position information that is information designating a position on the machining path, and the position information includes position data and an identifier, the position data being data including a plurality of elements and in which the plurality of elements are associated with a plurality of positions on the machining path on a one-to-one basis, the identifier being information designating one or more of the plurality of elements.

3. The laser machining system according to claim 2, wherein the laser oscillator emits the laser beam based on an oscillator command, and the processing circuitry moves the irradiation point along the machining path based on a drive command, and determines the oscillator command and the drive command such that the position information is associated with the oscillator command and/or the drive command.

4. The laser machining system according to claim 3, wherein the processing circuitry further generates a machining program and a sorting program, the processing circuitry determines the oscillator command and the drive command based on the machining program, the processing circuitry determines the sorting control command based on the sorting program, and the processing circuitry uses the machining program as the position data.

5. The laser machining system according to claim 1, wherein when the first part has the outer contour line, the processing circuitry stores the contour line evaluation information in which each of the outer contour line and the inner contour line is associated with the evaluation information.

6. The laser machining system according to claim 1, wherein the processing circuitry determines, based on the contour line evaluation information, whether to execute the sorting operation for each part.

7. The laser machining system according to claim 1, wherein the processing circuitry judges that the state of the machining for the contour line is good when the remaining material and the respective one of the first part and the second part are separable at the contour line, judges that the state of the machining for the contour line is poor when the remaining material and the respective one of the first part and the second part are inseparable at the contour line, and determines the evaluation information including a result of the judgment.

8. The laser machining system according to claim 1, wherein the processing circuitry determines the evaluation information including information indicating an evaluation of the state of the machining in terms of at least one machining defect item among burning, gouging, dross, flaws, upper surface roughness, middle surface roughness, lower surface roughness, oxide film peeling, and fading.

9. The laser machining system according to claim 1, wherein the processing circuitry includes at least one of an acoustic sensor, an optical sensor, a camera, a vibration sensor, an acceleration sensor, or a gyro sensor.

10. The laser machining system according to claim 1, comprising a display to display information on the sorting operation or information on the machining.

11. The laser machining system according to claim 1, wherein the processing circuitry further:

stores a machining signal in which the time-series signal and/or a feature extracted from the time-series signal is associated with the contour line;

determines a sorting judgment result that is a result of determining whether the sorting operation succeeds or fails;

stores a contour line judgment result in which the sorting judgment result is associated with the contour line;

observes state values including the machining signal and the contour line judgment result and related to the machining or the sorting operation;

executes learning for determining the contour line judgment result from the machining signal based on the state values; and determines the evaluation information from the machining signal based on a result learned.

12. The laser machining system according to claim 1, wherein the processing circuitry further:

stores a machining signal in which the time-series signal and/or a feature extracted from the time-series signal is associated with the contour line; and observes, as machining state values, values including the machining signal and related to the machining or the sorting operation; and the processing circuitry further includes a learned learning machine that has performed learning for determining the evaluation information from the machining signal based on values including a sorting judgment result and the machining signal and related to the machining or the sorting operation, the sorting judgment result being a result of determining whether the sorting operation has succeeded or failed.

13. The laser machining system according to claim 1, further comprising:

a hand; and a hand driver, wherein the processing circuitry determines a hand command based upon the sorting control command, and the hand driver drives the hand to grip and move the first part and the second part based upon the hand command.

14. The laser machining system according to claim 1, wherein the target position for defective parts includes a position for parts whose defects cannot be alleviated through post-processing, and the target position for non-defective parts includes a position for parts whose defects can be alleviated through post-processing.

* * * * *